(12) United States Patent
Misumi et al.

(10) Patent No.: US 9,092,126 B2
(45) Date of Patent: Jul. 28, 2015

(54) COMMUNICATION APPARATUS WITH DISPLAY SECTION AND COMPUTER-READABLE MEDIA

(75) Inventors: Noriko Misumi, Kiyosu (JP); Kazuhito Misumi, Kiyosu (JP)

(73) Assignee: Brother Kogyo Kabushiki Kaisha, Nagoya, Aichi-ken (JP)

( * ) Notice: Subject to any disclaimer, the term of this patent is extended or adjusted under 35 U.S.C. 154(b) by 440 days.

(21) Appl. No.: 12/619,630

(22) Filed: Nov. 16, 2009

(65) Prior Publication Data

US 2010/0125810 A1    May 20, 2010

(30) Foreign Application Priority Data

Nov. 14, 2008    (JP) .................................. 2008-291702

(51) Int. Cl.
  G06F 3/048       (2013.01)
  G06F 3/0485      (2013.01)
  H04N 1/00        (2006.01)

(52) U.S. Cl.
  CPC ............ *G06F 3/0485* (2013.01); *H04N 1/0035* (2013.01); *H04N 1/00244* (2013.01); *H04N 1/00435* (2013.01); *H04N 1/00464* (2013.01); *H04N 2201/0039* (2013.01); *H04N 2201/0094* (2013.01)

(58) Field of Classification Search
  USPC .................................. 715/784, 785; 709/202
  See application file for complete search history.

(56) References Cited

U.S. PATENT DOCUMENTS

| | | | |
|---|---|---|---|
| 5,893,115 A * | 4/1999 | Lewis | 1/1 |
| 6,583,797 B1 * | 6/2003 | Roth | 715/810 |
| 2003/0214667 A1 | 11/2003 | Ishikura et al. | |
| 2005/0185825 A1 | 8/2005 | Hoshino et al. | |
| 2006/0213976 A1 * | 9/2006 | Inakoshi et al. | 235/380 |

(Continued)

FOREIGN PATENT DOCUMENTS

| | | | |
|---|---|---|---|
| JP | H05-067009 A | 3/1993 | |
| JP | 2000-101947 A | 4/2000 | |

(Continued)

OTHER PUBLICATIONS

Trapani, Gina, "Do You Use Gmail's Web Clips?", Aug. 5, 2008, lifehacker.com/399841/do-you-use-gmails-we-clips.*

(Continued)

*Primary Examiner* — Matt Kim
*Assistant Examiner* — William Trapanese
(74) *Attorney, Agent, or Firm* — Baker Botts L.L.P.

(57) ABSTRACT

A communication apparatus is configured to, and a computer-readable medium causes a communication apparatus to store position information, acquire content relational information including titles summary information, and display each title of each content relational information in a scrolling single-line form. An accepting section accepts a selection of the displayed content title, and a summary display control section displays the summary information corresponding to the selected title. A selection information storage section stores selection information corresponding to the selected title. A priority setting section sets a priority for each content title of the content relational information based on the corresponding selection information stored in the selection information storage section. The display control section displays and scrolls each title of each of content relational information in a single-line form in a descending order based on the priority of each title.

20 Claims, 11 Drawing Sheets

(56) References Cited

U.S. PATENT DOCUMENTS

| | | | |
|---|---|---|---|
| 2006/0242201 A1* | 10/2006 | Cobb et al. | 707/104.1 |
| 2007/0089591 A1* | 4/2007 | Boys | 84/609 |
| 2007/0174298 A1 | 7/2007 | Tanimoto | |
| 2008/0010337 A1* | 1/2008 | Hayes et al. | 709/202 |
| 2008/0052343 A1* | 2/2008 | Wood | 709/202 |
| 2008/0165209 A1* | 7/2008 | Kondo et al. | 345/670 |
| 2009/0013071 A1 | 1/2009 | Matoba et al. | |
| 2009/0021780 A1 | 1/2009 | Sato et al. | |
| 2009/0083373 A1 | 3/2009 | Matoba et al. | |
| 2009/0171930 A1* | 7/2009 | Vaughan et al. | 707/5 |
| 2010/0036855 A1 | 2/2010 | Sasaki et al. | |
| 2010/0083016 A1 | 4/2010 | Inada | |
| 2010/0083126 A1 | 4/2010 | Inada | |
| 2010/0088329 A1 | 4/2010 | Kotake | |
| 2010/0088333 A1 | 4/2010 | Takahashi | |
| 2010/0106862 A1 | 4/2010 | Yanagawa | |

FOREIGN PATENT DOCUMENTS

| | | | |
|---|---|---|---|
| JP | 2000-270312 A | 9/2000 | |
| JP | 2000-285134 A | 10/2000 | |
| JP | 2002-334037 A | 11/2002 | |
| JP | 2003-338897 A | 11/2003 | |
| JP | 2004-287890 A | 10/2004 | |
| JP | 2005-031867 A | 2/2005 | |
| JP | 2005-228102 A | 8/2005 | |
| JP | 2005-284454 A | 10/2005 | |
| JP | 2006-215741 A | 8/2006 | |
| JP | 2006-324918 A | 11/2006 | |
| JP | 2007-179320 A | 7/2007 | |
| JP | 2007-199998 A | 8/2007 | |
| JP | 2007-265334 A | 10/2007 | |
| JP | 2007-299272 A | 11/2007 | |
| JP | 2008-026439 A | 2/2008 | |
| JP | 2008-099030 A | 4/2008 | |
| JP | 2008-102567 A | 5/2008 | |
| JP | 2008-158813 A | 7/2008 | |
| JP | 2008-165692 A | 7/2008 | |
| JP | 2008-188822 A | 8/2008 | |
| JP | 2008-210042 A | 9/2008 | |
| JP | 2008-225791 A | 9/2008 | |
| JP | 2008-226204 A | 9/2008 | |
| JP | 2009-015713 A | 1/2009 | |
| JP | 2009-075967 A | 4/2009 | |
| JP | 2010-081017 A | 4/2010 | |
| JP | 2010-086275 A | 4/2010 | |
| JP | 2010-086454 A | 4/2010 | |
| JP | 2010-086457 A | 4/2010 | |
| JP | 2010-087719 A | 4/2010 | |
| JP | 2010-103880 A | 5/2010 | |

OTHER PUBLICATIONS

Merriam-Webster's Online Dictionary, Jun. 23, 2007. Merriam-Webster.*

Japan Patent Office, Notice of Reasons for Rejection for Japanese Patent Application No. 2008-291702 (counterpart to above-captioned patent application), mailed Nov. 16, 2010.

Nikkei Network, "Common base for not only summarizing a page but also getting information," Oct. 22, 2005, pp. 68-72, No. 67, Nikkei BP, Japan.

* cited by examiner

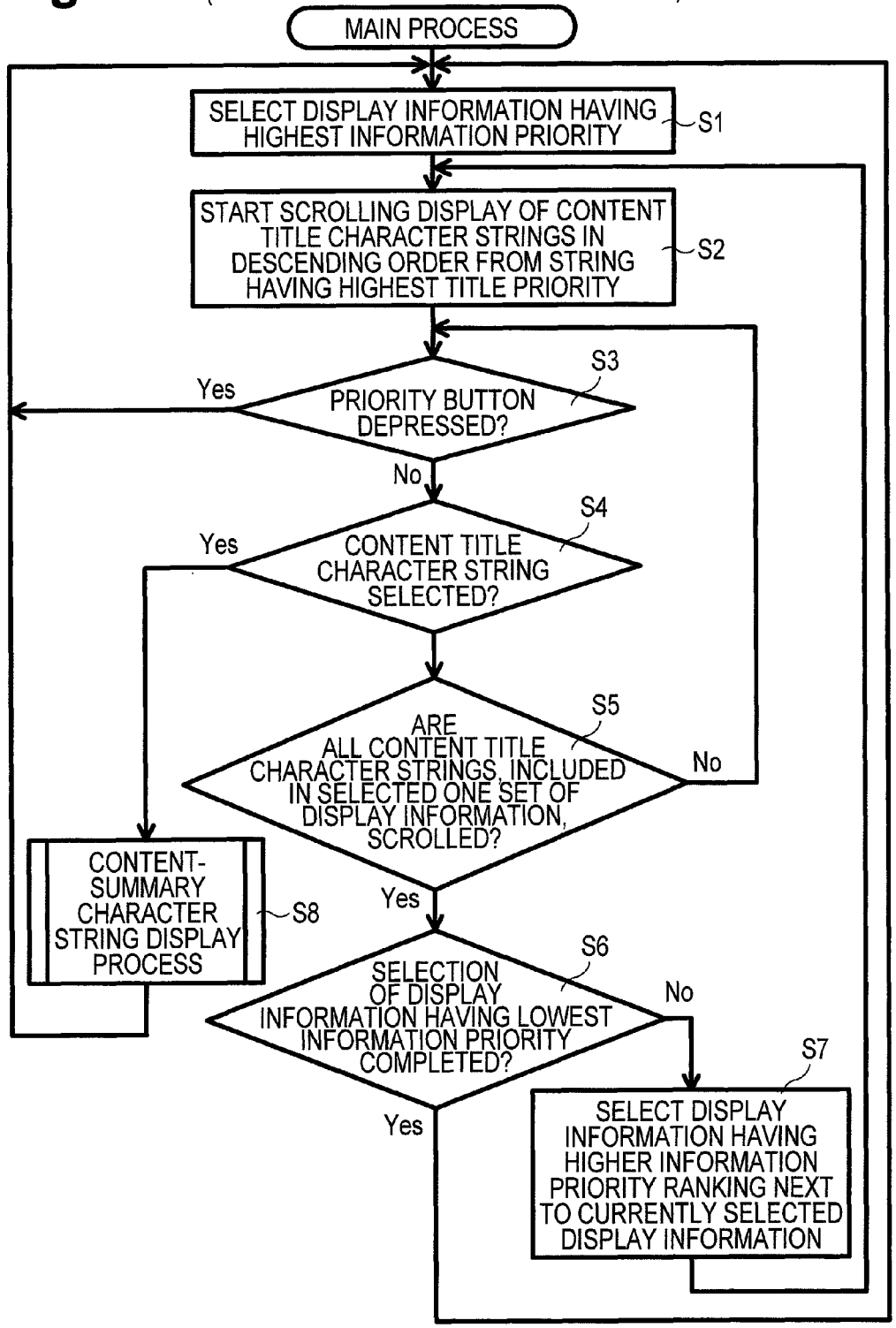

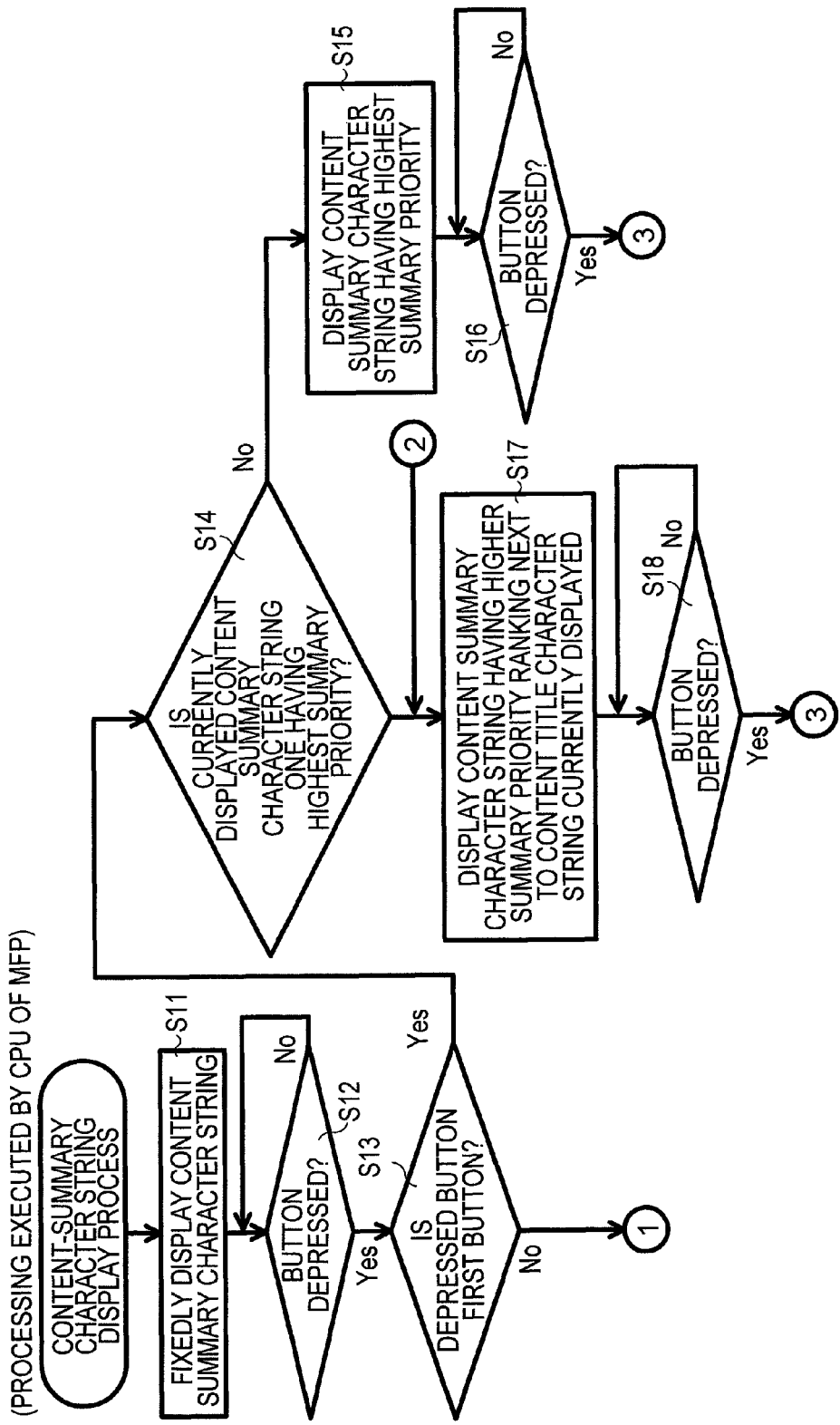

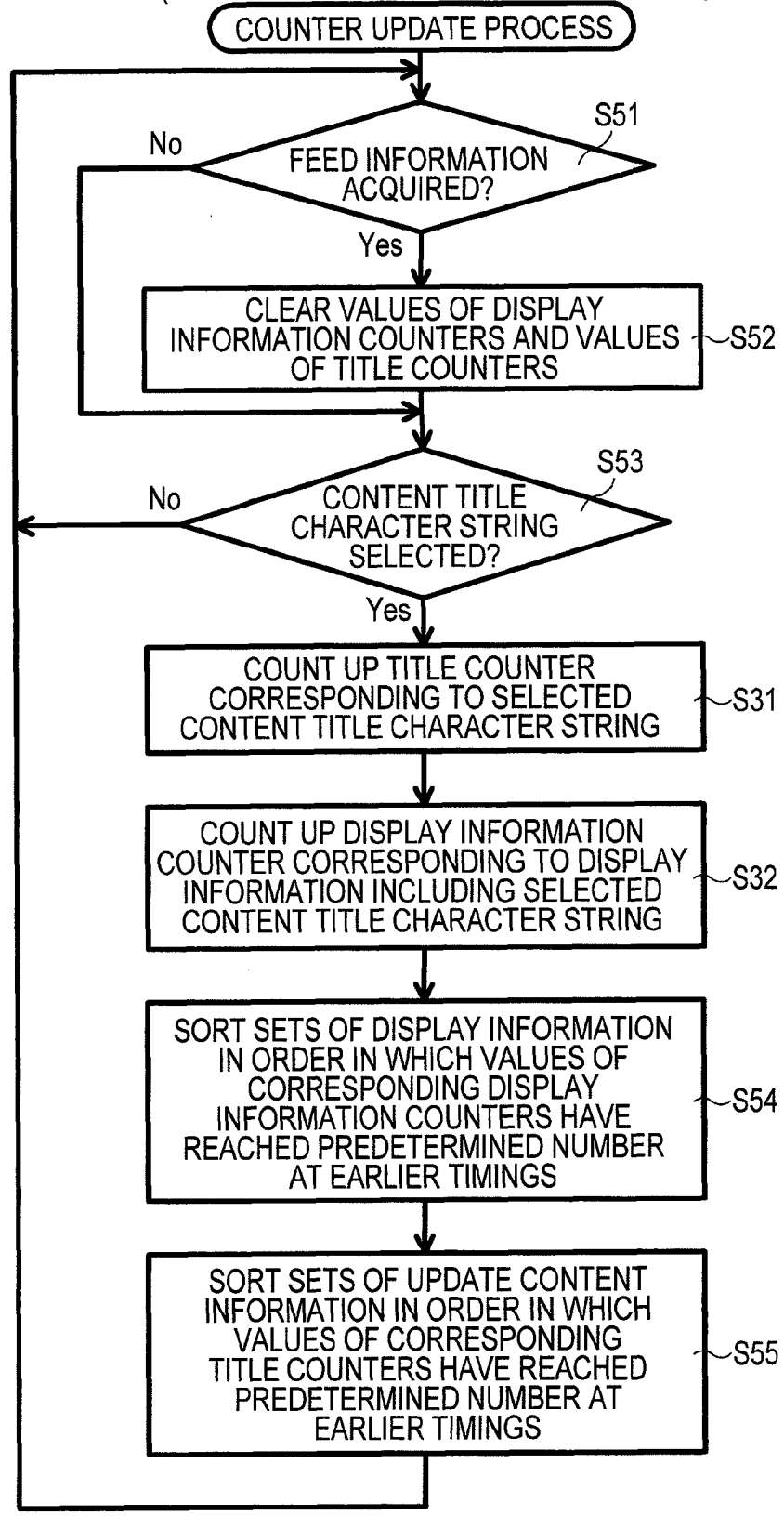

COMMUNICATION APPARATUS WITH DISPLAY SECTION AND COMPUTER-READABLE MEDIA

CROSS REFERENCE TO RELATED APPLICATION

The present application claims priority from Japanese Patent Application No. 2008-291702, which was filed on Nov. 14, 2008, the disclosure of which is incorporated herein by reference in its entirely.

BACKGROUND OF THE INVENTION

1. Field of the Invention

The present invention relates to a communication apparatus with a display section and a computer-readable media.

2. Description of Related Art

An information processing apparatus described in Japanese Unexamined Patent Application Publication No. 2008-165692, for example, is known as a technique for acquiring articles in the Resource Description Framework Site Summary ("RSS") format from a delivery site that delivers the articles in the RSS format, and for displaying a list of titles, etc. included in the acquired articles in the RSS format.

In the known information processing apparatus, the list of titles, etc. included in the articles in the RSS format acquired from the delivery site is displayed on an RSS article display unit 12. Therefore, a user can confirm the list of titles in a short time. However, the RSS article display unit 12 of the known information processing apparatus is assumed to have a display screen of a TV set or a personal computer, which has a relatively large-sized display screen. Accordingly, when the technique of the known information processing apparatus is applied to, e.g., a Multifunction Peripheral ("MFP"), the list of titles may not all be displayed on the display screen at a time because size of the display screen is relatively small. This gives rise to the problem that the user must repeatedly shift, e.g., change the display screen in order to confirm all the list of titles.

A known software system, e.g., software described in a non-patent document by Tomoyuki Ozu, "Display of article titles delivered from RSS-adapted sites like a electric bulletin board, 'Dirty News Reader'", [Online], May 26, 2004, Impress Corporation, [searched on Jul. 29, 2008], Internet, http://www.forest.impress.co.jp/article/2004/05/26/dirt-ynewsreader.html, when installed in an MFP, is able to acquire articles in the RSS format from the delivery site and to display the titles of the articles in the RSS format on a display screen in a scrolling manner. Accordingly, the user may confirm the list of the titles even with the MFP by continuously looking at the scrolled titles.

However, in the known system, the titles are successively displayed in a scrolling manner, e.g., scroll-displayed or scrolled, which creates a problem. When the MFP is set such that the titles for which the user wants to confirm with priority, e.g., higher-priority titles to be more frequently confirmed by the user, appear in the latter half or at the end of the scrolling display, a relatively long time is taken until those higher-priority titles are displayed. Therefore, the user cannot confirm the higher-priority titles in a short time.

SUMMARY OF THE INVENTION

With the view of solving the above-described problems, an object of the present invention is to provide a communication apparatus with a display section and a computer-readable media, which enable the higher-priority titles to be displayed in a short time.

In an embodiment of the invention, a communication apparatus comprises a position information storage section configured to store a plurality of position information, a relational information acquisition section configured to access a plurality of devices based on the plurality of position information, and to acquire a plurality of content relational information from the plurality of devices, wherein each content relational information of the plurality of content relational information comprises a plurality of content titles and a plurality of corresponding content summary information. The communication apparatus also comprises a relational information storage section configured to store the acquired plurality of content relational information, a display section, a display control section configured to display each content title of each of the plurality of content relational information on the display section, wherein each content title is displayed in a scrolling single-line form, an accepting section configured to accept a selection of the displayed content title of the plurality of content titles displayed on the display by the display control section, a summary display control section configured to display content summary information corresponding to the content title accepted by the accepting section on the display section, a selection information storage section configured to store a selection information corresponding to the content title accepted in the accepting section, and a priority setting section configured to set a priority for each content title of the plurality of content relational information based on the corresponding selection information stored in the selection information storage section. The display control section is configured to display and scroll each content title of each of the plurality of content relational information in a single-line form in a descending order based on the priority of each content title.

In another embodiment of the invention, A communication apparatus comprises a position information storage section configured to store a plurality of position information, a relational information acquisition section configured to access a plurality of devices based on the plurality of position information, and to acquire a plurality of content relational information from the plurality of devices, wherein each content relational information of the plurality of content relational information comprises a plurality of content titles and a plurality of corresponding content summary information. The communication apparatus also comprises a relational information storage section configured to store the acquired plurality of content relational information, a display section, a display control section configured to sequentially select one of the plurality of the content relational information stored in the relational information storage section, display each content title of the selected content relational information on the display section in a scrolling single-line form, and to select another one of the plurality of the content relational information after displaying all of the content titles of the selected content relational information, an accepting section configured to accept a selection of the displayed content title of the plurality of content titles displayed on the display by the display control section, a summary display control section configured to display content summary information corresponding to the content title accepted by the accepting section on the display section, a selection information storage section configured to store a content selection information corresponding to the content relational information of the content title accepted in the accepting section, and a priority setting section configured to set a content priority for each content relational information based on the corresponding content selection information stored in the selection information storage section. The display control section sequentially selects each content relational information in descending order of the content priority of the content relational information set by the priority setting section.

In yet another embodiment of the invention, a computer-readable medium is configured to store computer-readable instructions thereon for controlling a scrolling display of data on a communication apparatus having a display section, wherein the instructions, when executed, cause the communication apparatus to perform the steps of storing a plurality of position information, accessing a plurality of devices based on the plurality of position information, acquiring a plurality of content relational information from the plurality of the devices, wherein each content relational information of the plurality of content relational information comprises a plurality of content titles and a plurality of corresponding content summary information, storing the acquired plurality of content relational information, displaying each content title of each of the plurality of content relational information on the display section, wherein each content title is displayed in a scrolling single-line form, accepting a selection of the displayed content title of the plurality of content titles displayed on the display by the display control section, displaying content summary information corresponding to the content title accepted by the accepting section on the display section, storing a selection information corresponding to the content title accepted in the accepting section, setting a priority for each content title of the plurality of content relational information based on the corresponding selection information of the accepted content title, and displaying each content title of each of the plurality of content relational information in a scrolling single line-form, and scrolling each content title in a descending order based on the set priority of each of the content titles.

In still another embodiment of the invention, a computer-readable medium is configured to store computer-readable instructions thereon for controlling a scrolling display of data on a communication apparatus having a display section, wherein the instructions, when executed, cause the communication apparatus to perform the steps of storing a plurality of position information, accessing a plurality of devices based on the plurality of position information, acquiring a plurality of content relational information from the plurality of the devices, wherein each content relational information of the plurality of content relational information comprises a plurality of content titles and a plurality of corresponding content summary information, storing the acquired plurality of content relational information, sequentially selecting one of the plurality of the content relational information, displaying each content title of the selected content relational information on the display section in a scrolling single-line form, selecting another one of the plurality of the content relational information after displaying all of the content titles of the selected content relational information, accepting a selection of the displayed content title of the plurality of content titles displayed on the display by the display control section, displaying content summary information corresponding to the content title accepted by the accepting section on the display section, storing a content selection information corresponding to the content relational information of the content title accepted in the accepting section, setting a content priority for each content relational information based on the corresponding content selection information stored in the selection information storage section, and sequentially selecting each content relational information in descending order of the content priority of the content relational information set by the priority setting section.

Other objects, features, and advantages of embodiments of the present invention will be apparent to persons of ordinary skill in the art from the following description of preferred embodiments with reference to the accompanying drawings.

BRIEF DESCRIPTION OF THE DRAWINGS

For a more complete understanding of the present invention, the needs satisfied thereby, and the objects, features, and advantages thereof, reference now is made to the following description taken in connection with the accompanying drawings.

FIG. 5 is a flowchart illustrating a main process executed by the MFP.

FIGS. 6A-6C are flowcharts illustrating a content-summary character string display process executed by the MFP.

FIG. 9 is a flowchart illustrating a counter update process executed by the MFP.

DETAILED DESCRIPTION OF EMBODIMENTS OF THE INVENTION

Embodiments of the invention and their features and technical advantages may be understood by referring to FIGS. 1-9, like numerals being used for like corresponding portions in the various drawings. Embodiments of the present invention will be described below with reference to the accompanying drawings.

Figure 1:
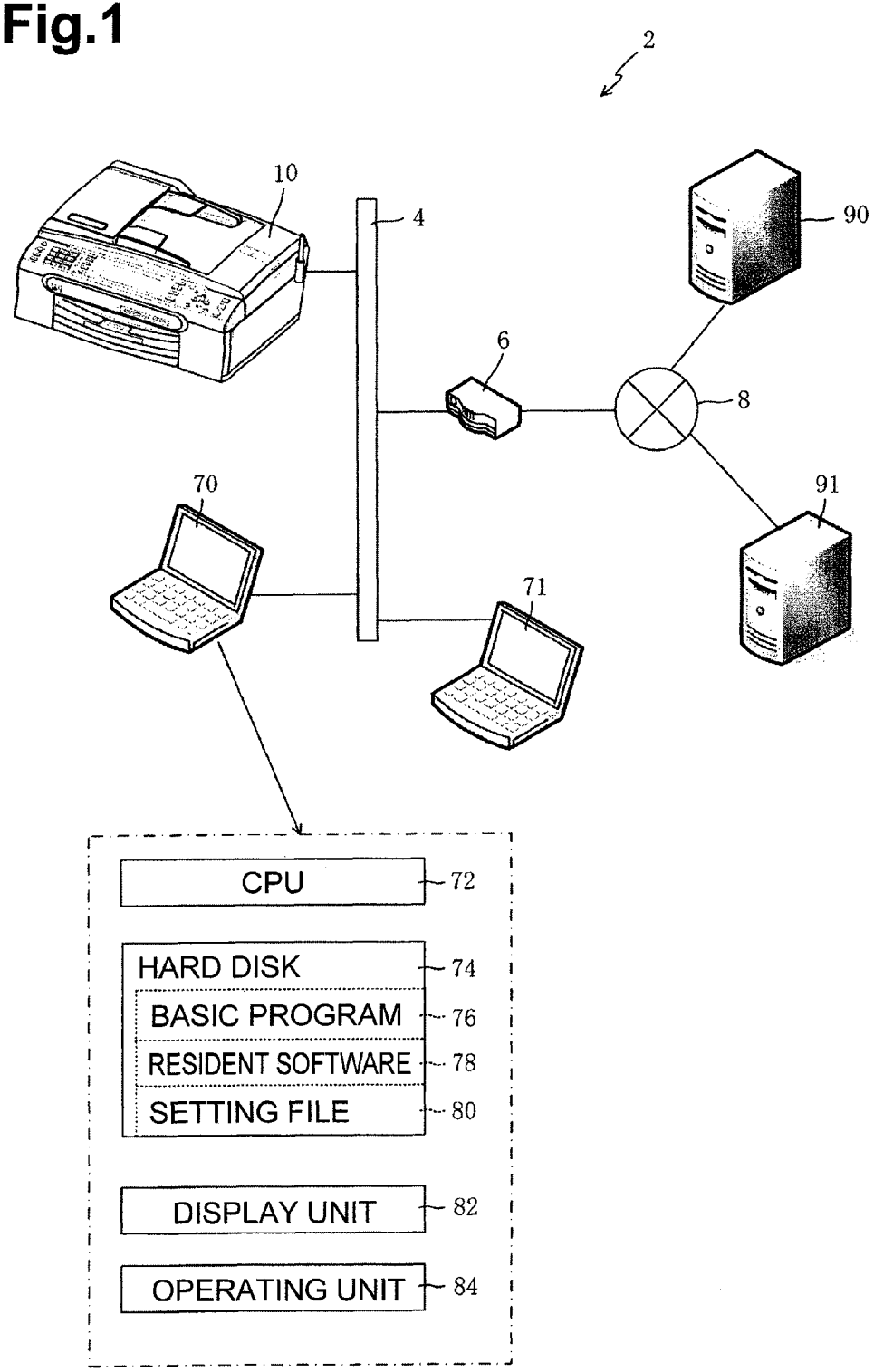
FIG. 1 illustrates an outline of an MFP system according to an embodiment of the invention.

FIG. 1 illustrates an outline of an MFP system 2 according to an embodiment of the invention. The MFP system 2 may comprise an MFP 10, a plurality of personal computers, hereinafter interchangeably abbreviated as "PCs", 70 and 71, and a plurality of content providing servers 90 and 91. Although FIG. 1 illustrates one MFP 10, two PCs 70 and 71, and two content providing servers 90 and 91, other embodiments of the invention may comprise different numbers of those components, as appropriate.

The MFP 10 may be, for example, a communication apparatus having a display section, e.g., as illustrated in FIG. 1, and may comprise a communication apparatus for providing a printing function, a scanner function, a telephone function, and the like. MFP 10 may be connected to a LAN line 4. The PCs 70 and 71 each may function as a control device for controlling the printing function and the scanner function of the MFP 10, and they may be connected to the LAN line 4. The LAN line 4 may be connected to the Internet 8 via a router 6. The content providing servers 90 and 91 each may be further connected to the Internet 8. In this embodiment, the content providing server 90 may open one site to the public, and the content providing server 91 may open another site to the public. Each site may comprise a plurality of contents.

Further, each of the content providing servers 90 and 91 stores feed information, e.g., feed information in the RSS format, e.g., summarized information of the plurality of contents included in its own site. These items of information stored in the content providing server will be described in more detail herein.

PC 71 may have substantially the same internal configuration as that of the PC 70. Therefore, a description of the internal configuration of the PC 71 is omitted here, and only a description of PC 70 follows. As shown in FIG. 1, the PC 70 may comprise a CPU 72, a hard disk 74, a display unit 82, and an operating unit 84. Though not illustrated in FIG. 1, the PC 70 further may comprise a network interface connected the LAN line 4. The CPU 72 may comprise an arithmetic and logic unit that may execute processing in accordance with a basic program 76 and resident software 78. The hard disk 74 may store the basic program 76 and the resident software 78. The basic program 76 may be a program for controlling the basic operation of the PC 70. The basic program 76 may comprise, for example, a browser for downloading contents from sites on the Internet 8 and displaying the downloaded contents. The resident software 78 may be a program for executing operations in accordance with instructions from the MFP 10. In an embodiment of the invention, the resident software 78 may be installed in the PC 70 from a computer-readable medium, for example.

Figure 2:
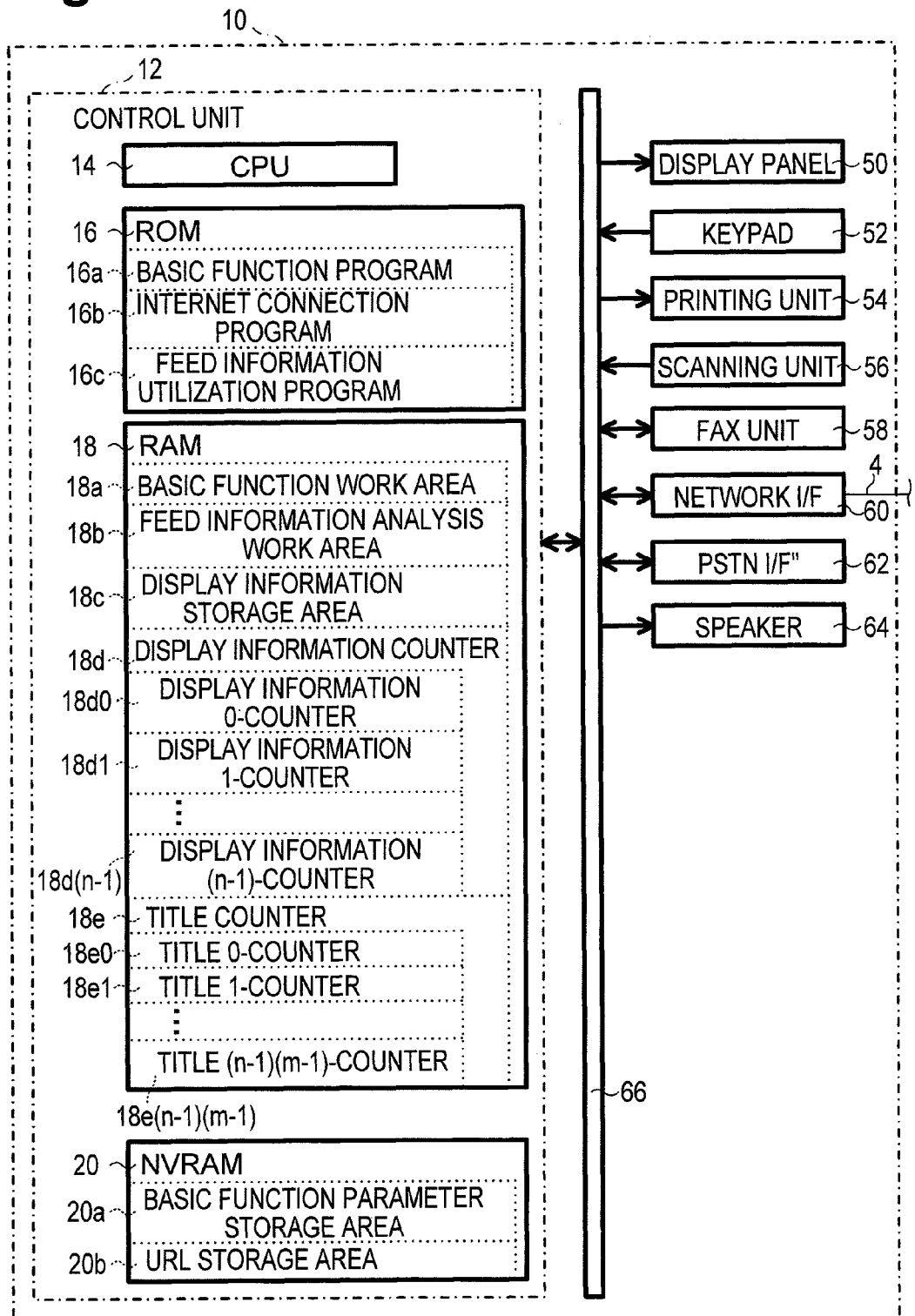
FIG. 2 is a block diagram illustrating an electric configuration of an MFP, according to an embodiment of the invention.

The hard disk 74 may store a setting file 80. The setting file 80 may include the IP address of the MFP 10. Items stored in the setting file 80 may be set by a user, for example. The PC 70 may identify the MFP 10 based on the IP address stored in the setting file 80. The information stored in the setting file 80 may be other information that is sufficient to uniquely identify the MFP 10. In other words, the information stored in the setting file 80 is not limited to the IP address and may be some other form of unique identifier, e.g., a node name. The display unit 82 may display various kinds of information, and may have a display screen larger than a display panel 50, e.g., a display section of the MFP 10, as shown in FIG. 2, for example. The operating unit 84 may comprise a keyboard, or a mouse, or both.

FIG. 2 is a block diagram illustrating an electric configuration of the MFP 10 according to an embodiment of the invention. The MFP 10 may comprise a control unit 12, a display panel 50, a keypad 52, a printing unit 54, a scanning unit 56, a FAX unit 58, a network interface (hereinafter interchangeably referred to as a "network I/F") 60, a PSTN interface (hereinafter interchangeably referred to as a "PSTN I/F") 62, and a speaker 64. The control unit 12 and the other various units 50 to 64 may be interconnected via a bus line 66. The control unit 12 may comprise a CPU 14, a ROM 16, a RAM 18, and an NVRAM 20.

The CPU 14 may be an arithmetic and logic unit that may execute processing in accordance with programs 16a to 16c stored in the ROM 16. The ROM 16 may be an read-only nonvolatile memory storing the programs 16a to 16c. A basic function program 16a may be a program for controlling basic operations of the MFP 10. The basic function program 16a may include, for example, a program for generating data displayed on the display panel 50. The basic function program 16a further may include, for example, programs for controlling the various units 50 to 64, including the printing unit 54, the scanning unit 56, and the FAX unit 58. An Internet connection program 16b, e.g., a relational information acquisition section, may be a program for connecting MFP 10 to the Internet 8 periodically, e.g., once per day, and acquiring feed information provided from the content providing servers 90 and 91. A feed information utilization program 16c may be a program that may execute such processing as, for example, when the program is booted up by the user operating the keypad 52, analyzing feed information acquired from the content providing servers 90 and 91, preparing information to be displayed on the display panel 50 (hereinafter interchangeably referred to as "display information"), and displaying the prepared display information.

The RAM 18 may be a readable/writable volatile memory comprising storage areas 18a to 18c, a display information counter 18d, e.g., a selection information storage section, and a title counter 18e, e.g., a selection information storage section. A basic function work area 18a may be a storage area for storing various data generated during processing executed in accordance with the basic function program 16a. A feed information analysis work area 18b may be a storage area for storing various data generated during processing executed in accordance with the feed information utilization program 16c. A display information storage area 18c, e.g., a relational information storage section, may be a storage area for storing the display information, which has been prepared in accordance with the feed information utilization program 16c by utilizing the acquired feed information.

Figure 3:
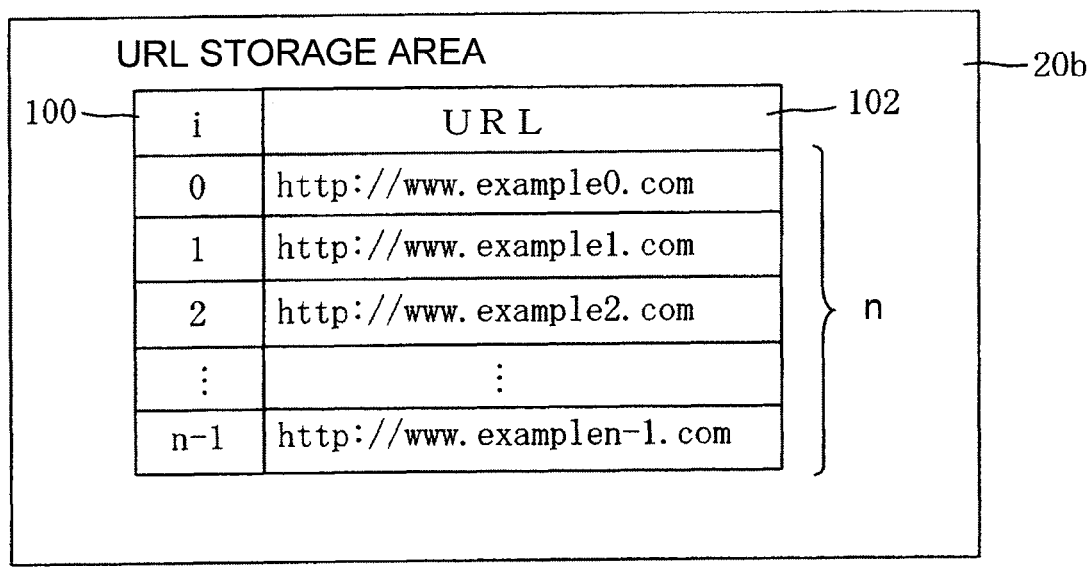
FIG. 3 illustrates one example of items stored in a URL storage area, according to an embodiment of the invention.
Figure 4:
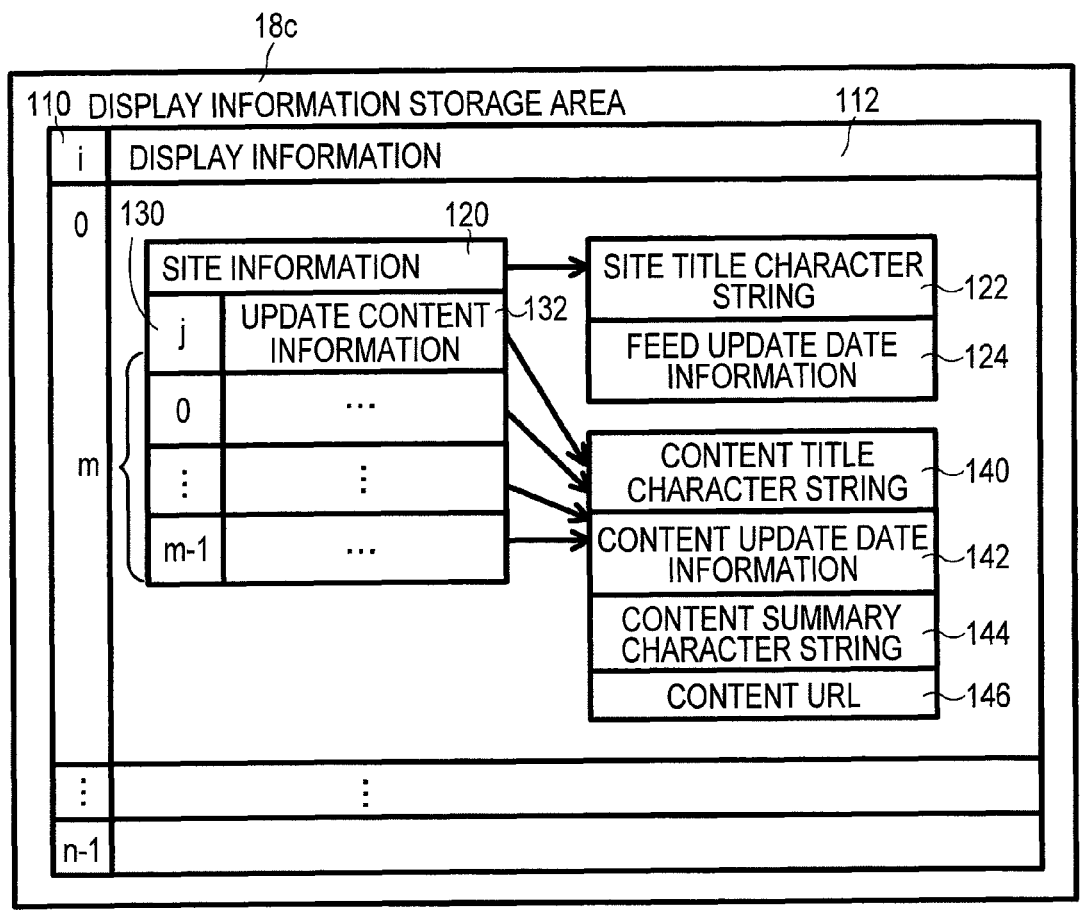
FIG. 4 illustrates one example of items stored in a display information storage area.

A display information counter 18d may be a counter for counting the number of selections with respect to the display information 112, including the selected content title character string 140, e.g., counting when a content title character string 140, e.g., corresponding to a content title scrolled on the display panel 50 in a one-line form is selected by the user touching the display panel 50. In the MFP 10 according to an embodiment, URLs, e.g., sources from which the feed information is acquired, may be stored in total number n, e.g., from 0 to n−1, wherein n is an integer equal to or larger than 1, in a later-described URL storage area 20b. In an embodiment of the invention, the feed information may be stored, for example, in a position information storage section, e.g., as shown in FIG. 3. Further, in the MFP 10 according to an embodiment, the display information 112 may be stored in the display information storage area 18c, as shown in FIG. 4, per URL, e.g., for each of the set sources from which the feed information is acquired, for each of the URLs from 0 to n−1. Accordingly, the display information counter 18d may be correlated with the display information 112 and may be provided in a total number n from a display information (0)-counter 18d(0) to a display information (n−1)-counter 18d(n−1).

The title counter 18e may be a counter for counting the number of times of selection with respect to the selected content title character string 140, e.g., when the content title character string 140, e.g., as shown in FIG. 4, scrolled on the display panel 50 in a one-line form is selected by the user touching the display panel 50. In the MFP 10 according to an embodiment, as described above, URLs may be stored in total number n, e.g., 0 to n−1, wherein n is an integer equal to or larger than 1, in the URL storage area 20b, as shown in FIG. 3. Further, the content title character strings 140 may be stored in total number m, e.g., 0 to m−1, wherein m is an integer equal to or larger than 1, in the display information storage area 18c, as shown in FIG. 4, per URL, e.g., for each of the set sources from which the feed information may be acquired, that is, for each of the URLs from 0 to n−1. Thus, the title counter 18e may be provided in a total number (n×m) from a title (0)(0)-counter 18c(0)(0) to title (n−1)(m−1)-counter 18e(n−1)(m−1) in correspondence with the content title character strings 140.

The use or non-use of those individual title counters 18e may be determined based on the number of the content title character strings 140 stored in the display information storage area 18*c*. Further, in the MFP 10 according to an embodiment, when the user selects the content title character string 140 that is currently displayed in a scrolling manner, a content summary character string 144, e.g., a content summary information, corresponding to the content title character string 140 may be fixedly displayed on the display panel 50. Accordingly, each title counter 18*e* also may count the number of times the content summary character string 144 has been displayed, in a correspondence relation.

The NVRAM 20 may be a writable volatile memory comprising storage areas 20*a* and 20*b*. A basic function parameter storage area 20*a* may be a storage area for storing various parameters, e.g., settings in the printing function and settings in the scanning function, which may be employed when the CPU 14 executes the processing in accordance with the basic function program 16*a*. A URL storage area 20*b* may be a storage area for storing the URLs that indicate the acquisition sources of the feed information held in the content providing servers 90 and 91.

The user may be required to perform URL setting to receive service for providing contents from each of the content providing servers 90 and 91. The URL setting may be made, for example, on a site setting screen (not shown) displayed on the display panel 50. When the URLs indicating the acquisition sources of the feed information held in the content providing servers 90 and 91 are set on the site setting screen by the user operating the keypad 52, the set URLs may be stored in the URL storage area 20*b*.

In another embodiment, instead of the site setting screen, the PCs 70 and 71 also may be used to perform the URL setting. For example, when the user performs the URL setting to receive the service for providing contents from the content providing server 90 by employing the PC 70, the URL indicating the acquisition source of the feed information held in the content providing server 90 may be output from the PC 70 to the MFP 10. As a result, the URL indicating the acquisition source of the feed information held in the content providing server 90 may be stored in the URL storage area 20*b*.

The display panel 50 may be a display device for displaying various kinds of information, and may be a display screen that is smaller than that of each of the PCs 70 and 71. The display panel 50 also may function as a touch panel. The keypad 52 may comprise a plurality of keys. The user may input various kinds of instructions and information to the MFP 10 by operating the keypad 52. The printing unit 54 may comprise a printing mechanism, e.g., of the ink jet type or the laser type. The scanning unit 56 may comprise a reading mechanism, e.g., a CCD or a CIS. The FAX unit 58 may execute various operations necessary for executing FAX communication. The network I/F 60 may be connected to the LAN line 4. Thus, the MFP 10 may be configured both to communicate with the PCs 70 and 71, and also to access the Internet 8. The PSTN I/F 62 may be connected to a Public Switched Telephone Network ("PSTN") (not shown). The PSTN may be employed to perform communication, e.g., FAX and telephone communication. The speaker 64 may be a sound generating device that may output a sound, e.g., a ring, upon arrival of a call with the telephone function.

FIG. 3 illustrates one example of the items which may be stored in the URL storage area 20*b*, e.g., as shown in FIG. 2, according to an embodiment of the invention. The URL storage area 20*b* may store URLs 102 indicating the acquisition sources of the feed information held in the content providing servers 90 and 91. In the example of FIG. 3, the URL storage area 20*b* may store a number n of URLs 102. Each URL 102 may be assigned with an ID number 100. In an embodiment, the ID number 100 may be represented by a symbol "i". FIG. 4 illustrates an example of the items stored in the display information storage area 18*c*. The display information storage area 18*c* may store the display information 112 per URL stored in the URL storage area 20*b*. Each set of display information 112 may be assigned with an ID number 110. In an embodiment, the ID number 110 may be represented by a symbol "i". The ID number 100 may be the same information as the ID number 110.

In an embodiment, when the MFP 10 acquires feed information by using the Internet connection program 16*b*, the MFP 10 may access the content providing servers 90 and 91 in ascending order of the URLs 102 stored in the URL storage area 20*b*. Then, the MFP 10 may store the display information 112, generated from the acquired feed information, in the display information storage area 18*c* in ascending order of the URLs 102 stored in the URL storage area 20*b*.

Further, in an embodiment, when the MFP 10 begins scrolling display of the content title character string 140, the MFP 10 successively may select one of the sets of display information 112, which may be used in the scrolling display, in ascending order from the first display information 112 having the symbol "i" assigned with a minimum value "0" (zero) to the last display information 112 having the symbol "i" assigned with a maximum value "n−1". Then, the MFP 10 may display the content title character string 140 included in the selected one set of display information 112 while scrolling the set of display information 112.

Figure 7:
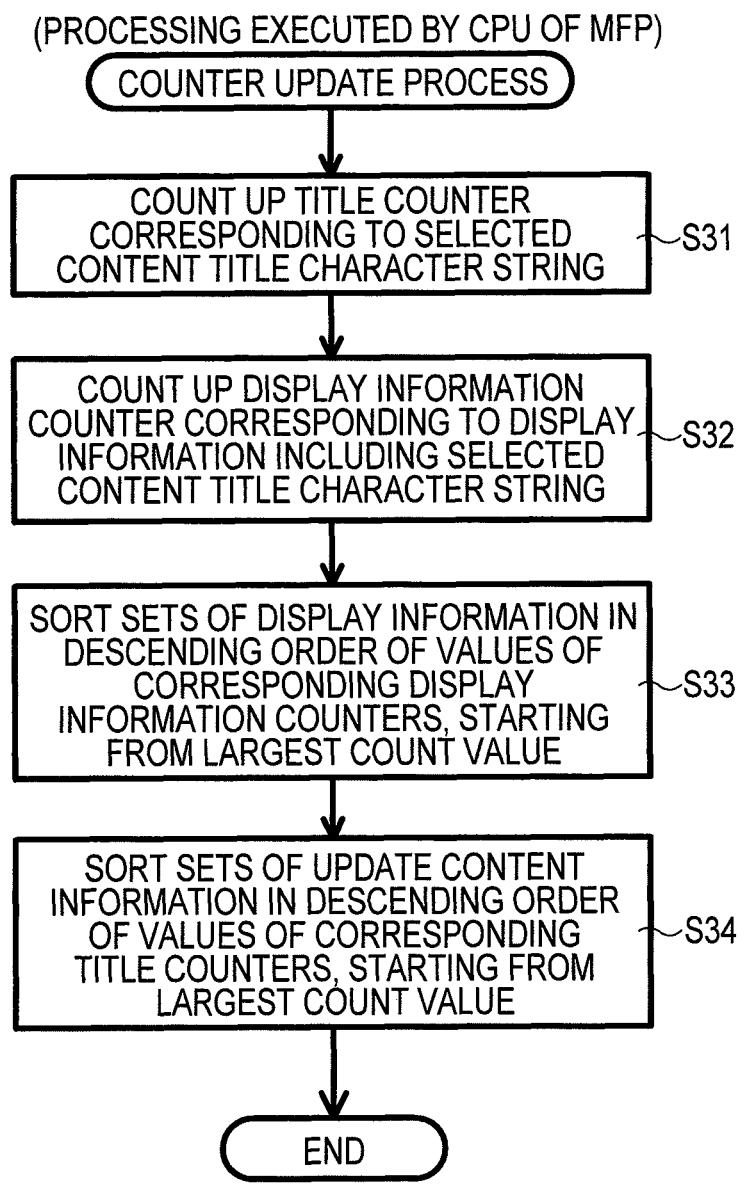
FIG. 7 is a flowchart illustrating a counter update process executed by the MFP.
Figure 8:
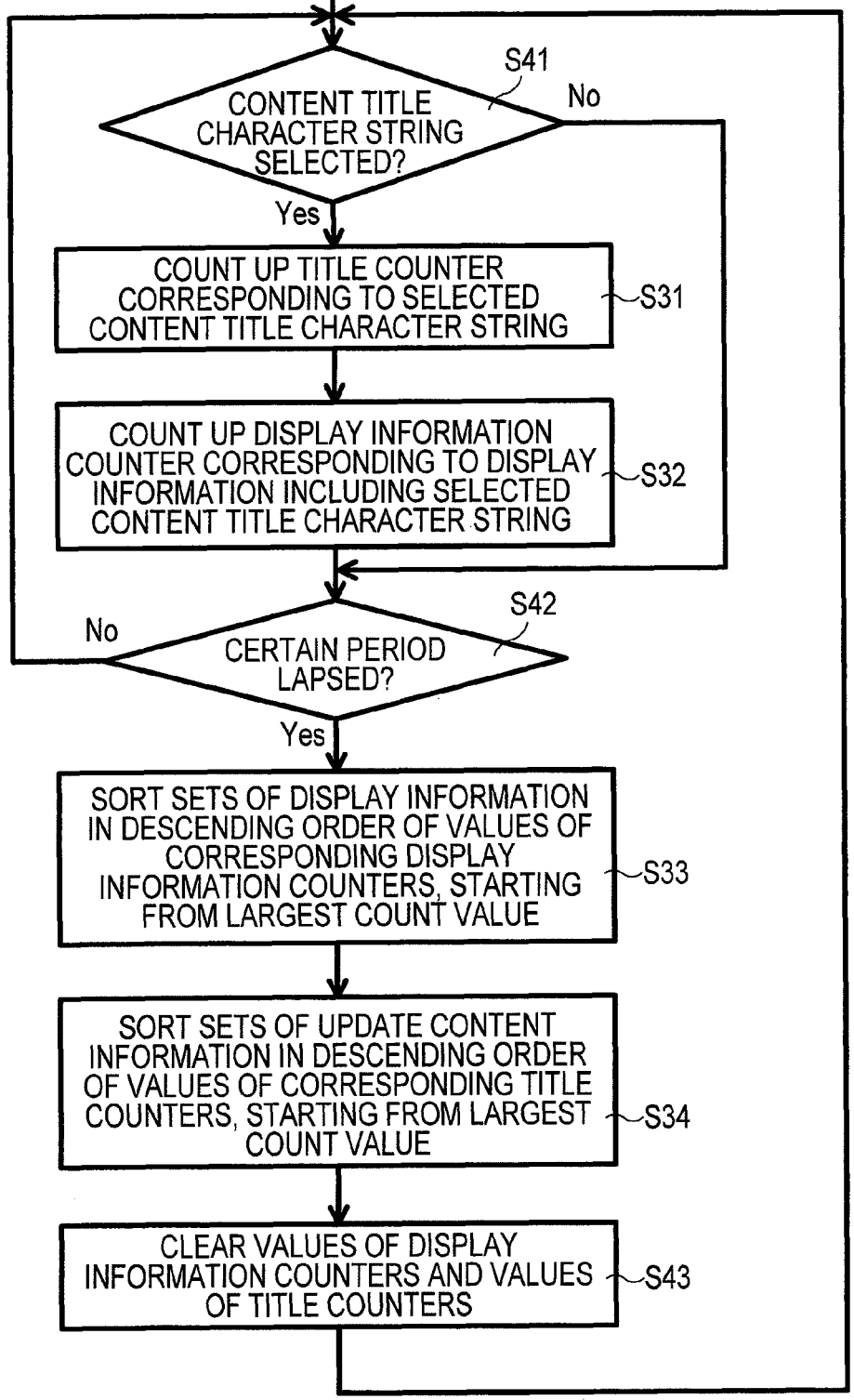
FIG. 8 is a flowchart illustrating a counter update process executed by the MFP.

In an embodiment, in an initial state prior to the assignment of the symbol "i" to each set of display information 112, in descending order of information priority as a result of executing counter update processes illustrated in FIGS. 7 to 9, the MFP 10 successively may select one of the sets of display information 112, which may be used in the scrolling display, in the order in which the sets of display information 112 have been stored, e.g., in ascending order of the URLs 102 stored in the URL storage area 20*b*. Specifically, in the initial state, the MFP 10 may assign the symbol "i" having the minimum value "0" (zero) to the display information 112 that corresponds to, e.g., "http://www.example0.com" stored in the URL storage area 20*b*, and may assign the symbol "i" having the maximum value "n−1" to the display information 112 corresponding to "http://www.examplen−1.com" stored in the URL storage area 20*b*. Then, the MFP 10 first may select the display information 112 corresponding to "http://www.example0.com" and the MFP 10 finally may select the display information 112 corresponding to "http://www.examplen−1.com".

Thereafter, when the counter update processes illustrated in FIGS. 7 to 9 are executed, the MFP 10 may set the information priority for the display information 112 to be greater, as a value of the display information counter 18*d* increases, or as a value of the display information counter 18*d* reaches a predetermined number at an earlier timing. As a result, the MFP 10 successively may assign the symbol "i" in ascending order, starting from the minimum value, to the sets of display information 112 in descending order, starting from the highest-priority display information 112. More specifically, the symbol "0" (zero) may be assigned to the display information 112 having the highest information priority, while the symbol "n−1" may be assigned to the display information 112 having the lowest information priority.

A data configuration of each set of display information 112 according to an embodiment of the invention, will be described herein. The display information 112 may include site information 120. The site information 120 may include a site title character string 122 and a feed update date information 124. The site title character string 122 may be a character string representing the site title. The feed update date information 124 may be information corresponding to the date when the feed information has been updated in each of the content providing servers 90 and 91, e.g., the latest update date.

The display information 112 may comprise plural sets of update content information 132. The number of the sets of update content information 132 may be equal to the number of contents held in the relevant site. In the example shown in FIG. 4, the display information 112 corresponding to "i=0" may include a number m, wherein m is an integer equal to or larger than 1, of update content information 132. This number m represents that the site corresponding to "i=0" has a number m of contents. For example, when a predetermined site includes contents regarding weather forecasts and contents regarding sports, the display information 112 corresponding to the relevant site includes two sets of update content information 132. Each set of update content information 132 may be assigned with an ID number 130. In an embodiment, the ID number 130 may be represented by a symbol "j". Each set of update content information 132 may include the content title character string 140 and the content summary character string 144. Thus, the symbol "j" assigned to each set of update content information 132 further may be applied to both the content title character string 140 and the content summary character string 144, each of which may be included in the relevant set of update content information 132.

In an embodiment, when the MFP 10 stores sets of display information 112, which may be prepared from the feed information acquired by using the Internet connection program 16b, in the display information storage area 18c in ascending order of the URLs 102 stored in the URL storage area 20b, the MFP 10 may store sets of update content information 132 in the display information storage area 18c, in the same order as the order in which the sets of update content information 132 are described in the acquired feed information.

Further, in an embodiment, when the MFP 10 starts scrolling display of the content title character strings 140, the MFP 10 successively may select one of the sets of display information 112, which is used in the scrolling display, and scroll-displays the content title character strings 140 in ascending order from the first content title character string 140 having the symbol "j" assigned with a minimum value "0 (zero)" to the last display information 112 having the symbol "j" assigned with a maximum value "m−1", which are included in the selected one set of display information 112.

In an embodiment, in an initial state prior to the assignment of the symbol "j" to the content title character strings 140, which may be included in each set of display information 112, in descending order of title priority as a result of executing the counter update processes illustrated in FIGS. 7 to 9, the MFP 10 may scroll-display the content title character strings 140, which may be included in the selected one set of display information 112, in the order in which the sets of update content information 132 have been stored, e.g., in the order described in the acquired feed information. Specifically, in the initial state, the MFP 10 may assign the symbol "j" having the minimum value "0" (zero) to the content title character string 140 which is described first in the acquired feed information, and may assign the symbol "j" having the maximum value "m−1" to the content title character string 140 which is described last in the acquired feed information. Then, the MFP 10 may execute scrolling display in the order from the content title character string 140 which is described first in the acquired feed information to the content title character string 140 which is described last in the acquired feed information.

Thereafter, when the counter update processes illustrated in FIGS. 7 to 9 are executed, the MFP 10 may set the title priority for the content title character string 140 to be higher for each set of display information 112 as a value of the title counter 18e increases, or as a value of the title counter 18e reaches a predetermined number at an earlier timing, similarly to the above-described operation with the display information 112. As a result, the MFP 10 successively may assign the symbol "j" in ascending order, starting from the minimum value, to the content title character strings 140 in descending order, starting from the highest-priority content title character string 140. Specifically, the symbol "0" (zero) may be assigned to the content title character string 140 having the highest title priority, while the symbol "m−1" may be assigned to the content title character string 140 having the lowest title priority.

Each set of update content information 132 may includes, in addition to the content title character string 140 and the content summary character string 144, content update date information 142 and a content URL 146. In the above-mentioned example, the update content information 132 corresponding to contents regarding weather forecasts may include the items of information 140 to 146, and the update content information 132 corresponding to contents regarding sports also includes the items of information 140 to 146. The content title character string 140 may be a character string representing the content title. The content update date information 142 may be information regarding the date, e.g., the latest update date, when the content has been updated in the content providing server.

The content summary character string 144 may be a summary of character strings included in the relevant content. Stated another way, the content summary character string 144 may be a character string which has a larger number of characters than the content title, but which has a smaller number of characters than the entire content and which reflects the details of the content. The content URL 146 may be the URL of the relevant content. The MFP 10 also may display, in addition to the content title character string 140, the content update date information 142 and the content URL 146 in a scrolling manner on the display panel 50.

FIGS. 5 to 9 illustrate processing executed by the CPU 14 of the MFP 10. As shown in FIG. 5, in an embodiment of the invention, first, a main process may be executed by the CPU 14 of the MFP 10 when the feed information utilization program 16c stored in the ROM 16 of the MFP 10 is booted up. The main process may be repeatedly executed during a period in which the feed information utilization program 16c is actuated. In the main process, at Step S1, the CPU 14 may select, from among the sets of display information 112 including the content title character strings 140 which are scrolled on the display panel 50 in the one-line form, one set of display information having the highest information priority. As described above, the sets of display information 112 stored in the display information storage area 18c each may be assigned, in descending order starting from the highest-priority display information 112, with the symbol "i", e.g., the ID number 110, in ascending order from the minimum value "0". By successively selecting one of the sets of display information 112 in ascending order of the symbol "i" from the display information 112 assigned with the symbol "i" of "0" (zero) in the processing Step S1, the CPU 14 automatically may select the sets of display information 112 one by one in descending order of the information priority from the highest-priority display information. In the initial state, as described above, the CPU 14 may select the display information 112 one at a time to be used in the scrolling display in ascending order of the URLs 102 stored in the URL storage area 20*b*.

At Step S2, the CPU 14 may start the scrolling display of all the content title character strings 140, which may be included in the selected one set of display information 112, in descending order of the title priority from the highest-priority string. After the execution of the processing step S2 has been started, the CPU 14 may continue the scrolling display of the content title character strings 140 in descending order of the title priority even during the determination processing steps, e.g., Steps S3 to S5.

As described above, the content title character strings 140 stored in the display information storage area 18*c* may be assigned in descending order of the title priority starting from the highest-priority string, per set of display information 112, with the symbol "j", e.g., the ID number 130, in ascending order from the minimum value "0" (zero). With the start of the processing Step S2, therefore, the CPU 14 automatically may display all the content title character strings 140, which may be included in the selected one set of display information 112, on the display panel 50 in descending order of the title priority while scrolling the content title character strings 140 in ascending order from the content title character string 140 assigned with the symbol "j" of "0" (zero) to the content title character string 140 assigned with the symbol "j" of the maximum value "m−1". In the initial state, as described above, the CPU 14 may display the content title character strings 140, which may be included in the selected one set of display information 112, in the order in which the content title character strings 140 have been described in the feed information.

After the processing Step S2, then at Step S3, CPU 14 may determine whether a priority button (not shown) displayed on the display panel 50 is depressed. If the determination result indicates that the priority button is depressed, e.g., "YES" at Step S3, then the CPU 14 may return to the processing Step S1. Thus, by depressing the priority button, the content title character strings 140 included in the display information 112 having the highest information priority again may be displayed in a scrolling manner. Stated another way, even when the scrolling display of the content title character strings 140 included in the display information 112 having the higher information priority has already ended, the content title character strings 140 included in that display information 112 again may be displayed again in a short time.

If the determination result of the processing Step S3 indicates that the priority button is not depressed, e.g., "NO" at Step S3, then at Step S4, the CPU 14 determines whether the scrolled content title character string 140 is selected by the user touching the display panel 50. If the determination result indicates that the scrolled content title character string 140 is not selected, e.g., "NO" at Step S4, then at Step S5, the CPU 14 further may determine whether the scrolled content title character strings 140 included in the selected one set of display information 112 all have been scrolled.

Specifically, when the content title character strings 140 included in the selected set of display information 112 are present in number m from the symbol "0" to "m−1", as shown in FIG. 4, for example, the CPU 14 may determine, in the processing Step S5, whether the scrolling display of the content title character string 140 has been executed m times. If the determination result indicates that the scrolling display of the content title character string 140 has been executed m times, the CPU 14 may determine that the content title character strings 140 included in the selected one set of display information 112 all have been scrolled. If the determination result indicates that the scrolling display of the content title character string 140 has not yet executed m times, the CPU 14 may determine that the scrolling display of all the content title character strings 140 is not yet completed.

If the determination result of the processing Step S5 indicates that the content title character strings 140 included in the selected one set of display information 112 are not yet all scrolled, e.g., "NO" at Step S5, then the CPU 14 returns to the processing Step S3. If the determination result indicates that the content title character strings 140 included in the selected one set of display information 112 have been all scrolled, e.g., "YES" at Step S5, then at Step S6, the CPU 14 may determine whether the selection of the display information 112 having the lowest information priority has been completed.

Specifically, when the display information 112 is present in number n from the symbol "0" to "n−1", for example, the CPU 14 may determine, in the processing Step S6, whether the selection of the display information 112 has been executed n times. If the determination result indicates that the selection of the display information 112 has been executed n times, the CPU 14 may determine that the selection of the display information 112 having the lowest information priority has been completed. If the determination result indicates that the selection of the display information 112 has not yet been executed n times, the CPU 14 may determine that the selection of the display information 112 having the lowest information priority is not yet completed.

If the determination result of the processing Step S6 indicates that the selection of the display information 112 having the lowest information priority is not yet completed, e.g., "NO" at Step S6, then at Step S7, the CPU 14 may select the display information 112 having a higher information priority ranking next to the currently selected display information 112, and then may return to Step S2. If the determination result indicates that the selection of the display information 112 having the lowest information priority is completed, e.g., "YES" at Step S6, then the CPU 14 may return to Step S1.

Additionally, if the determination result of the processing step S4 indicates that the content title character string 140 is selected, e.g., "YES" at Step S4, then at Step S8, the CPU 14 may execute a content-summary character string display process for fixedly displaying the content summary character string 144, which may correspond to the selected content title character string 140, on the display panel 50. After executing Step S8, the CPU 14 may return to Step S1.

Figure 6B:
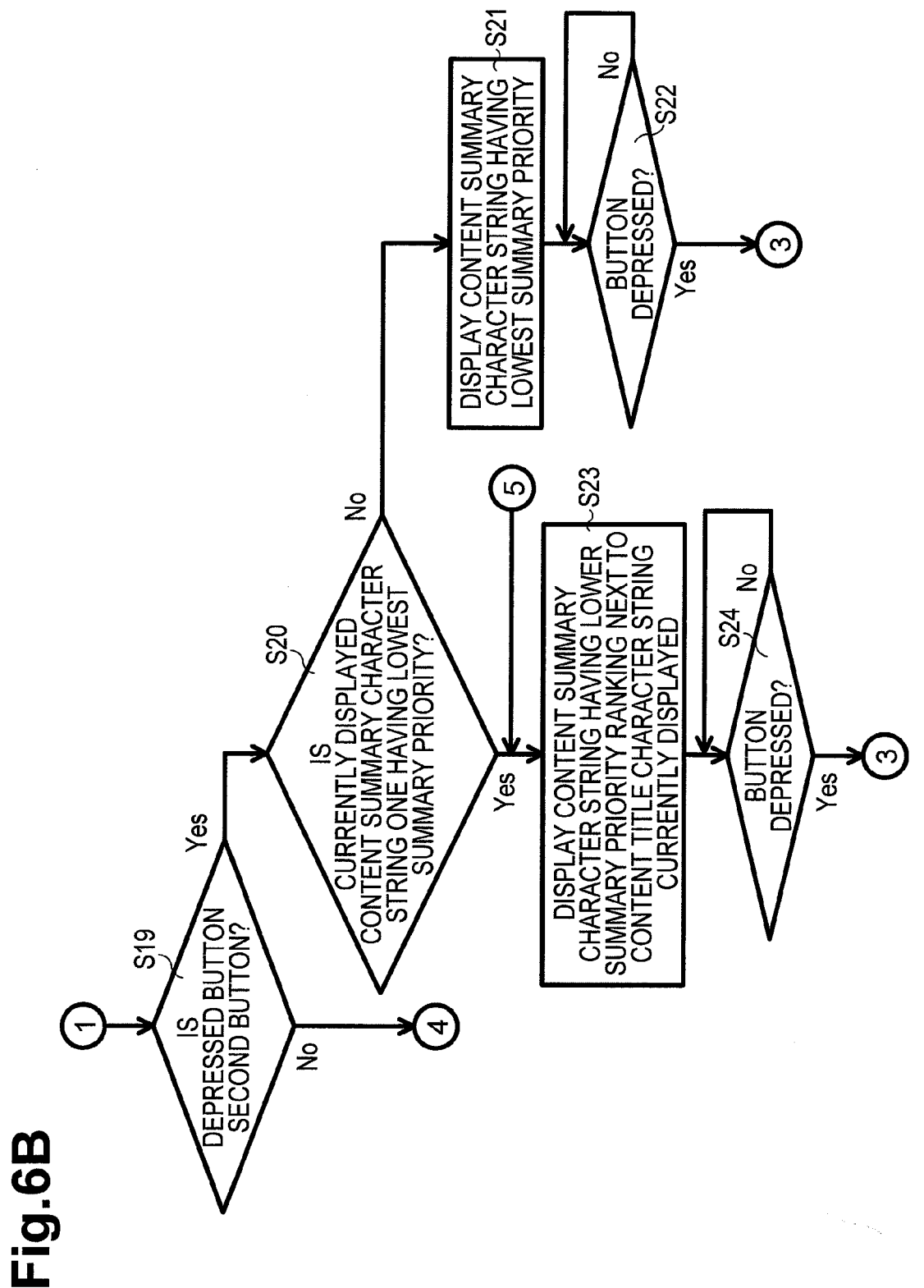
Figure 6C:
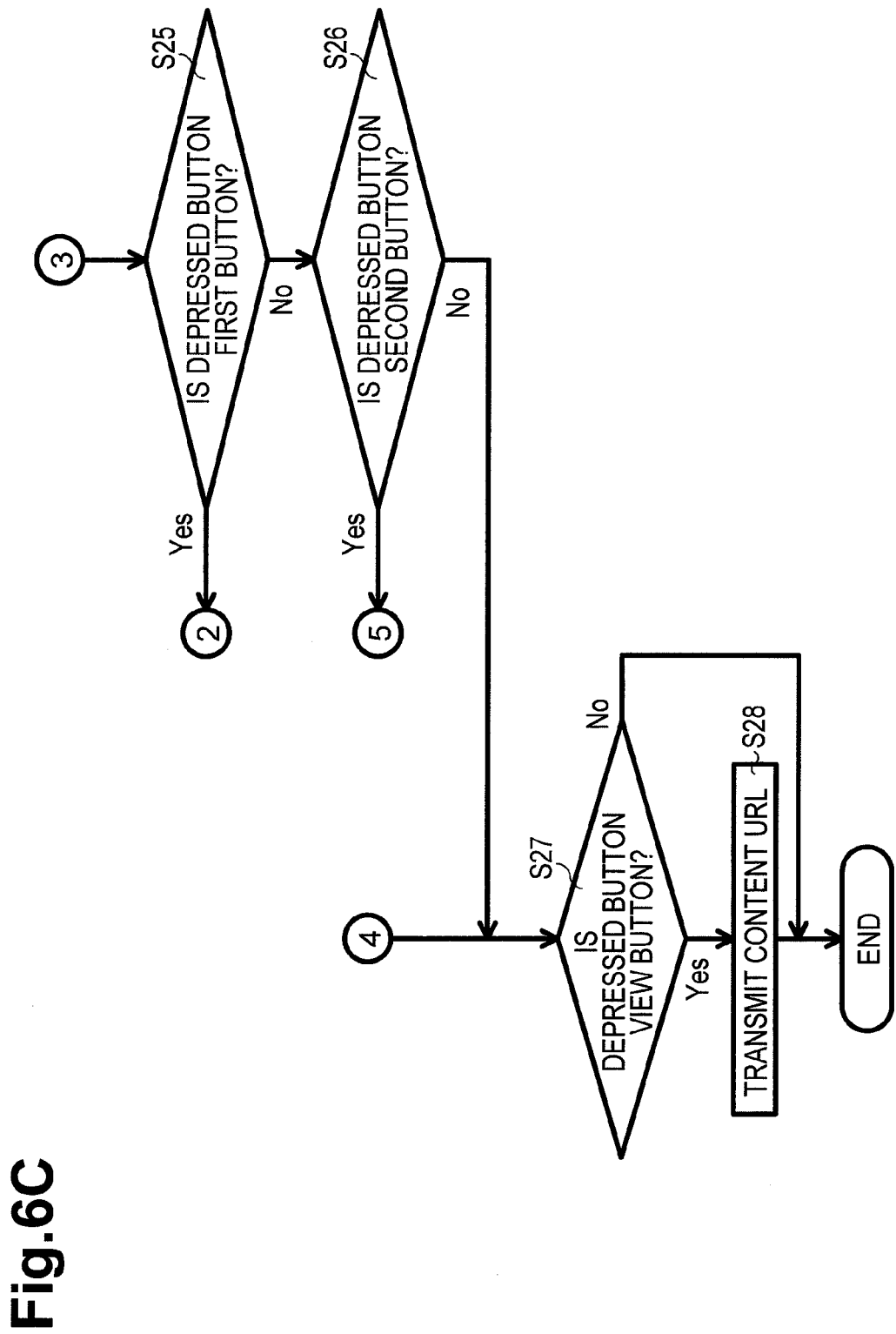

FIGS. 6A to 6C describe the content-summary character string display process executed by the CPU 14 of MFP 10, according to an embodiment of the invention. In the content-summary character string display process, first, at Step S11, which may correspond to the content title character string 140 selected in Step S4 of FIG. 5, the CPU 14 may specify the content summary character string 144, from the update content information 132 and may fixedly display the specified content summary character string 144 on the display panel 50. Then, at Step S12, the CPU 14 may determine whether any of a first button (not shown), a second button (not shown), a view button (not shown), and a cancel button (not shown) displayed on the display panel 50 is depressed. If the determination result indicates that none of the aforementioned buttons is depressed, e.g., "NO" at Step S12, then the CPU 14 repeatedly executes Step S12 until one of the buttons is depressed. If the determination result indicates that one of the aforementioned buttons is depressed, e.g., "YES" at Step S12, then at Step S13, the CPU 14 determines whether the depressed button is the first button.

If the determination result indicates that the depressed button is the first button, e.g., "YES" at Step S13, then at Step S14, the CPU 14 may determine whether the content summary character string 144 currently displayed on the display panel 50 in the processing step S11 is the content summary character string having the highest priority. Herein, the priority of the content summary character string 144, hereinafter interchangeably referred to as the "summary priority," may be set based on the symbol "j", e.g., the ID number 130, which may be assigned to the update content information 132, or the content title character string 140. Thus, the summary priority may be the same as the title priority. In Step S14, therefore, the CPU 14 may determine whether the content summary character string 144 currently displayed is the content summary character string having the highest summary priority, based on whether the symbol "j" assigned to the content summary character string 144 currently displayed on the display panel 50 in the processing step S11 is the minimum value "0" (zero).

If the determination result of Step S14 determines that the content summary character string 144 currently displayed on the display panel 50 in Step S11 is not the content summary character string having the highest summary priority, e.g., "NO" at Step S14, then at Step S15, CPU 14 may fixedly display the content summary character string 144 having the highest summary priority on the display panel 50. Thereafter, at Step S16, the CPU 14 may determine whether one of the buttons is depressed.

If the determination result indicates that none of the aforementioned buttons is depressed, e.g., "NO" at Step S16, then the CPU 14 repeatedly may execute Step S16 until one of the aforementioned buttons is depressed. If the determination result indicates that one of the aforementioned buttons is depressed, e.g., "YES" at Step S16, then the CPU 14 may shift to Step S25.

If the determination result of Step S14 determines that the content summary character string 144 currently displayed on the display panel 50 in the processing step S11 is one having the highest summary priority, e.g. "YES" at Step S14, then at Step S17, the CPU 14 may fixedly display the content summary character string 144 having a higher summary priority ranking next to the content summary character string 144 currently displayed on the display panel 50. Thereafter, at Step S18, the CPU 14 may determine whether one of the aforementioned buttons is depressed. If the determination result indicates that none of the aforementioned buttons is depressed, e.g., "NO" at Step S18, then the CPU 14 repeatedly executes Step S18 until one of the buttons is depressed. If the determination result indicates that one of the aforementioned buttons is depressed, e.g., "YES" at Step S18, then the CPU 14 shifts to Step S25.

Returning to Step S13, if the determination result of Step S13 indicates that the button depressed in the processing step S12 is not the first button, e.g., "NO" at Step S13, then at Step S19, CPU 14 may determine whether the depressed button is the second button. If the determination result indicates that the depressed button is the second button, e.g., "YES" at Step S19, then at Step S20, the CPU 14 may determine whether the content summary character string 144 currently displayed on the display panel 50 in the processing step S11 is the content summary character string having the lowest summary priority. In Step S20, whether the content summary character string 144 currently displayed is one having the lowest summary priority may be determined based on whether the symbol "j" assigned to the content summary character string 144 currently displayed is the minimum value "m−1".

If the determination result of Step S20 determines that the content summary character string 144 currently displayed on the display panel 50 in the processing step S11 is not the content summary character string having the lowest summary priority, e.g., "NO" at Step S20, then at Step S21, the CPU 14 may fixedly display the content summary character string 144 having the lowest summary priority on the display panel 50. Thereafter, at Step S22, the CPU 14 again may determine whether one of the aforementioned buttons is depressed. If the determination result indicates that none of the aforementioned buttons is depressed, e.g., "NO" at Step S22, then the CPU 14 repeatedly executes Step S22 until one of the aforementioned buttons is depressed. If the determination result indicates that one of the buttons is depressed, e.g., "YES" at Step S22, then the CPU 14 shifts to Step S25.

If the determination result of Step S20 determines that the content summary character string 144 currently displayed on the display panel 50 in the processing step S11 is the content summary character string having the lowest summary priority, e.g., "YES" at Step S20, then at Step S23, the CPU 14 may fixedly display the content summary character string 144 having a lower summary priority ranking next to the content summary character string 144 currently displayed. Thereafter, at Step S24, the CPU 14 determines whether one of the aforementioned buttons is depressed. If the determination result indicates that none of the aforementioned buttons is depressed, e.g. "NO" at Step S24, then the CPU 14 repeatedly executes Step S24 until one of the buttons is depressed. If the determination result indicates that one of the aforementioned buttons is depressed, e.g., "YES" at Step S24, the CPU 14 may shift to Step S25.

In Step S25, the CPU 14 may determine whether the depressed button is the first button. If the determination result indicates that the depressed button is the first button, e.g., "YES" at Step S25, then the CPU 14 may shift to Step S17. If the determination result indicates that the depressed button is not the first button, e.g., "NO" at Step S25, then at Step S26, the CPU 14 may determine whether the depressed button is the second button. If the determination result of the processing step S26 indicates that the depressed button is the second button, e.g., "YES" at Step S26, then the CPU 14 may shift to Step S23. If the determination result indicates that the depressed button is not the second button, then the CPU 14 may shift to Step S27. Moreover, referring again to Step S19, if the determination result of Step S19 indicates that the depressed button is not the second button, e.g., "NO" at Step S19, then the CPU 14 may shift to Step S27.

In Step S27, the CPU 14 may determine whether the depressed button is the view button. If the determination result indicates that the depressed button is the view button, e.g. "YES" at Step S27, then at Step S28, the CPU 14 may specify the content URL 146, which may correspond to the content summary character string 144 fixedly displayed on the display panel 50, from the update content information 132, and may transmit the specified content URL 146 to the PCs 70 and 71.

When the PCs 70 and 71 receive the content URL 146 output from the MFP 10, each of PCs 70 and 71 may start, e.g., boot up or run, the browser program previously installed therein, and then accesses corresponding one of the content providing servers 90 and 91 to display the content, which may be represented by the content URL 146 output from the MFP 10, on the display unit 82. As a result, the user may confirm the content corresponding to the content summary character string 144, which may be fixedly displayed at that time, by using the display unit 82 of one of the PCs 70 and 71, each of which may have a larger, e.g., a wider, screen than the display panel 50, thereby providing easier and more clear viewing.

If the determination result of Step S27 indicates that the depressed button is not the view button, e.g., "NO" at Step S27, then the CPU 14 may end the content-summary character string display process upon determining that the depressed button is a cancel button instructing the end of the content-summary character string display process.

FIGS. 7 to 9 illustrate the counter update processes executed by the CPU 14 of the MFP 10 according to an embodiment of the invention. The MFP 10 executes one of the counter update processes, each of which is illustrated in one of FIGS. 7 to 9, which may be selected in accordance with an instruction from the user operating the keypad 52. Thus, the user may employ one of the counter update processes, at the user's discretion.

FIG. 7 shows one counter update processes according to an embodiment of the invention. The counter update process illustrated in FIG. 7 may be a process executed when the content title character string 140 is selected in the processing step S4 (shown in FIG. 5) of the main process. In the counter update process of FIG. 7, first, at Step S31, the CPU 14 may count up, e.g., increment, the title counter 18e by one, which corresponds to the selected content title character string 140. Then, at Step S32, the CPU 14 may count up, e.g., increment, the display information counter 18d by one, which may correspond to the display information 112 including the selected content title character string 140.

Then, at Step S33, the CPU 14 may sort the sets of display information 112, which may be stored in the display information storage area 18c, in descending order of values of the display information counters 18d, starting from the display information 112 corresponding to the largest count value. Specifically, the CPU 14 may assign the symbol "i", e.g., the ID number 110, from the minimum value "0" (zero) to the maximum value "n−1" to the sets of display information 112, in descending order of the values of the display information counters 18d, starting from the display information 112 corresponding to the largest count value.

After Step S33, then at Step S34, CPU 14 may sort the sets of update content information 132, e.g., the individual content title character strings 140, which may be included in the display information 112 including the selected content title character string 140, in descending order of the values of the title counters 18e, starting from the content title character string 140 corresponding to the largest count value. Specifically, the CPU 14 may assign the symbol "j", e.g., the ID number 130, from the minimum value "0" (zero) to the maximum value "m−1" to the sets of update content information 132, which may be included in the selected display information 112, in descending order of the values of the title counters 18e, starting from the content title character string 140 corresponding to the largest count value.

When the counter update process as described in FIG. 7 is used, when the content title character string 140 is selected, the display information counter 18d and the title counter 18e each may be cumulatively counted up. Further, the sets of display information 112 may be sorted in descending order of the values of the display information counters 18d, starting from the display information 112 corresponding to the largest count value. Also, the sets of update content information 132 may be sorted in descending order of the values of the title counters 18e, starting from the content title character string 140 corresponding to the largest count value.

FIG. 8 shows another counter update processes according to an embodiment of the invention. The counter update process illustrated in FIG. 8 may be a process that is repeatedly executed when the MFP 10 is powered on and the feed information utilization program 16c is started, e.g., booted up. In the following description of the counter update process of FIG. 8, the same steps as those in the counter update process of FIG. 7 are denoted by the same symbols, and a detailed description of these same steps is omitted. In the counter update process of FIG. 8, at Step S41, the CPU 14 first may determine whether the content title character string 140 is selected by the touching operation of the user. If the determination result indicates that the content title character string 140 is selected, e.g., "YES" at Step S41, the CPU 14 may execute Steps S31 and S32, and then shift to Step S42. If the determination result indicates that the content title character string 140 is not selected, e.g., "NO" at Step S41, then the CPU 14 may skip Steps S31 and S32, and may shift to Step S42.

At Step S42, the CPU 14 may whether a certain, e.g., a predetermined, period has lapsed from the counting start of the display information counter 18d and the title counter 18e. With respect to the embodiment described herein, the certain period is a period that has lapsed from the acquisition of the feed information. In an embodiment of the invention, in which the feed information may be configured to be acquired once per day, for example, the certain period may be set to three days, or to one week. The certain period may be counted by a timer (not shown), which may be included in the NVRAM 20 of the MFP 10. Until a period counted by the timer reaches the set certain period, a value of the timer may not reset, even when the feed information is newly acquired.

If the determination result indicates that the certain period has not yet lapsed, e.g. "NO" at Step S42, then the CPU 14 returns to Step S41. If the determination result indicates that the certain period has lapsed, e.g., "YES" at Step S42, then the CPU 14 may execute the processing steps S33 and S34. Then, at Step S34, the CPU 14 may clear the values of the display information counter 18d and the title counter 18e, e.g., reset the values of the display information counter 18d and the title counter 18e to zero. The CPU 14 then may return to Step S41.

When the counter update process of FIG. 8 as described above is used, the sets of display information 112 and the sets of update content information 132 may be sorted in descending order of the priority, respectively, corresponding to the values of the display information counters 18d and the values of the title counters 18e, which may be counted for the certain period longer than the period in which the feed information is newly acquired and the display information 112 is updated. Accordingly, the sets of display information 112 and the sets of update content information 132 may be sorted based on the number of times the individual content title character strings 140 have been selected by the user over a long period, rather than the more temporary determiner of the number of times a selection is made by the user for a short period, on the content title character strings 140 included in the latest display information 112.

FIG. 9 shows yet another counter update processes according to an embodiment of the invention. The counter update process illustrated in FIG. 9 may be a process that is repeatedly executed when the MFP 10 is powered on and the feed information utilization program 16c is started, e.g., booted up. In the following description of the counter update process of FIG. 9, the same steps as those in the counter update process of FIG. 7 are denoted by the same symbols, and a detailed description of these same steps is omitted. In the counter update process of FIG. 9, first, at Step S51, the CPU 14 may determine whether the feed information is acquired. If the determination result indicates that the feed information is acquired, e.g., "YES" at Step S51, then at Step S52, CPU 14 may clear the values of the display information counter 18d and the title counter 18e, e.g., reset the values of the display information counter 18d and the title counter 18e to zero. The CPU 14 then may shift to Step S53. If the determination result indicates that the feed information is not acquired, e.g., "NO" at Step S51, then the CPU 14 may skip Step S52 and shifts to Step S53.

In Step S53, the CPU 14 may determine whether the content title character string 140 is selected by the touching operation of the user. If the determination result indicates that the content title character string 140 is not selected, e.g. "NO" at Step S53, then the CPU 14 may return to Step S51. If the determination result indicates that the content title character string 140 is selected, e.g., "YES" at Step S53, then the CPU 14 executes Steps S31 and S32. In Step S54, the CPU 14 may sort the sets of display information 112, stored in the display information storage area 18c, in the order in which values of the display information counters 18d have reached a predetermined number at earlier timings. More specifically, the CPU 14 may assign the symbol "i", e.g., the ID number 110, from the minimum value "0" (zero) to the maximum value "n−1" to the sets of display information 112, in the order in which values of the display information counters 18d have reached the predetermined number at earlier timings. Thus, the sets of display information 112 to be selected by the CPU 14 may be sorted in the order in which the values of the display information counters 18d have reached the predetermined number at earlier timings, e.g., in descending order of the information priority.

Further, at Step S55, the CPU 14 may sort the sets of update content information 132 e.g., the individual content title character strings 140, which may be included in the display information 112 including the selected content title character string 140, in the order in which values of the title counters 18e have reached a predetermined number at earlier timings. Specifically, the CPU 14 may assign the symbol "j", e.g., the ID number 130, from the minimum value "0" (zero) to the maximum value "m−1" to the sets of update content information 132, which may be included in the selected display information 112, in the order in which the values of the title counters 18e have reached the predetermined number at earlier timings. Thus, the sets of update content information 132, e.g., the individual content title character strings 140, which may be used in the scrolling display by the CPU 14, may be sorted for each set of display information 112 in the order in which the values of the title counters 18e have reached the predetermined number at earlier timings, e.g., in descending order of the title priority. After Step S55, the CPU 14 may return to Step S51.

In the counter update process illustrated in FIG. 9, as described above, the sets of display information 112 and the sets of update content information 132 may be sorted in descending order of the priority, respectively, corresponding to the order in which the values of the display information counters 18d and the values of the title counters 18e have reached the predetermined numbers of times at earlier timings, during periods from a time when the sets of display information 112 are each updated and the display information counters 18d and the title counters 18e are cleared to zero to a time when those counters are next cleared to zero. Accordingly, the sets of display information 112 and the sets of update content information 132 may be sorted based on the number of times of selection made by the user for a relatively shorter period on the content title character strings 140 included in the latest display information 112.

In an embodiment, as described above, when one of the scrolled content title character strings 140 is selected by the touching operation of the user, the value of the display information counter 18d corresponding to the display information 112 including the selected content title character string 140 and the value of the title counter 18e corresponding to the selected content title character string 140 each may be incremented, e.g., counted up. The MFP 10 assigns the symbol "i" in ascending order thereof to the sets of display information 112 in descending order of the values of the display information counters 18d, or in the order in which the values of the title counters 18e have reached the predetermined number at earlier timings. In other words, the MFP 10 sorts the sets of display information 112 in descending order of the information priority, starting from the highest-priority display information 112. Further, the MFP 10 may assign, per set of display information 112, the symbol "j" to the sets of update content information 132, e.g., the individual content title character strings 140, in descending order of the values of the title counters 18e, or in the order in which the values of the title counters 18e have reached the predetermined number at earlier timings. The MFP 10 may sort, per set of display information 112, the content title character strings 140 in descending order of the title priority, starting from the highest-priority content title character string 140. Accordingly, when the scrolling display is started, the MFP 10 successively may select one of the sets of display information 112 in descending order of the information priority, starting the highest-priority display information 112, and may display the content title character strings 140, which may be included in the selected one set of display information 112, in descending order of the title priority, starting from the highest-priority content title character string 140. As a result, the MFP 10 may display the content title character string 140 having a higher information priority and a higher title priority in a shorter time.

In an embodiment of the invention, the information priority of the display information 112 including the more-frequently selected content title character string 140, for which the display information counter 18d counts a larger value or for which the value of the display information counter 18d has reached the predetermined number at an earlier timing, may be set to a higher level, while the information priority of the display information 112 including the content title character string 140, which is less frequently selected, may be set to a lower level. Similarly, the title priority of the more-frequently selected content title character string 140, for which the title counter 18e counts a larger value or for which the value of the title counter 18e has reached the predetermined number at an earlier timing, may be set to a higher level, while the title priority of the content title character string 140, which is less frequently selected, may be set to a lower level. Nevertheless, in another embodiment, information priority of the display information 112 including the selected content title character string 140, which is less frequently selected, may be set to a higher level, while the information priority of the display information 112 including the content title character string 140, which is more frequently selected, may be set to a lower level. Similarly, the title priority of the selected content title character string 140, which is less frequently selected, may be set to a higher level, while the title priority of the content title character string 140, which is more frequently selected, may be set to a lower level.

The above-described modification can be practiced as described herein. The MFP 10 may assign the symbol "i" in ascending order, starting from the minimum value "0", to the sets of display information 112 in ascending order of the values of the display information counters 18d or in the order in which the values of the title counters 18e have reached a predetermined number at later timings. Further, the MFP 10 may assign the symbol "j" in ascending order, starting from the minimum value "0" (zero), to the sets of update content information 132 in ascending order of the values of the title counters 18e, or in the order in which the values of the title counters 18e have reached a predetermined number at later timings. In such a modification, when the scrolling display is started, the MFP 10 preferentially may display the content title character string 140 in a scrolling manner, which may be less frequently selected. It is therefore possible, for the user who preferentially wants to confirm the content title character string 140 which is selected at a low frequency or which is not selected at all, to display the content title character string 140 desired by the relevant user in a shorter time in a scrolling manner.

In an embodiment of the invention, the content title character strings 140 may be sorted based on the title priority, in addition to sorting the sets of display information 112 based on the information priority. Nevertheless, in another embodiment, the sets of display information 112 may be sorted based on the information priority without sorting the content title character strings 140 based on the title priority. In such an embodiment, when the scrolling display is started, the MFP 10 successively may select one of the sets of display information 112 in descending order of the information priority, starting from the highest-priority display information 112, and may display the content title character strings 140, which are included in the selected display information 112, in a scrolling manner in the preset order. Therefore, the content title character strings 140 included in the selected display information 112 having a higher information priority may be displayed in a shorter time.

In an embodiment of the invention, the sets of display information 112 may be sorted based on the information priority, in addition to sorting the content title character strings 140 based on the title priority. Nevertheless, in another embodiment of the invention, all the content title character strings 140 stored in the display information storage area 18c may be sorted in descending order of the title priority, starting from the highest-priority content title character string 140, without sorting the sets of display information 112 based on the information priority. Specifically, when one of the scrolled content title character strings 140 is selected by the touching operation of the user, the MFP 10 may increment, e.g., count up, the title counter 18e corresponding to the selected content title character string 140. Then, the MFP 10 may assign the symbol "j" in ascending order from a minimum value "(0)(0)" (zero) to a maximum value "(n−1)(m−1)" to all the sets of update content information 132, which may be stored in the display information storage area 18c, in descending order of the values of the title counters 18d, or in the order in which the values of the title counters 18e have reached the predetermined number at earlier timings. Thus, the MFP 10 may sort all the content title character strings 140, which are stored in the display information storage area 18c, in descending order of the title priority regardless of in which one of the sets of display information 112 the content title character string 140 is included.

In this embodiment, when the scrolling display is started, the MFP 10 may display the content title character strings 140 in descending order of the title priority, starting the highest-priority content title character string 140. In this embodiment, the content title character strings 140 may be displayed in descending order of the title priority, starting from the highest-priority content title character string 140, regardless of in which one of the sets of display information 112 the content title character string 140 is included. Thus, the MFP 10 may display the content title character string 140 having a higher title priority in a shorter time.

When the above-described embodiment is implemented with the main process, e.g., as shown in FIG. 5, executed by the MFP 10 of the above-described embodiment, Steps S1, S5 and S7 may be deleted, and Step S6 may be modified as follows. First, Step S6 may be changed to a step of determining whether "the scrolling display of the content title character string 140 having the lowest title priority is completed". If the determination result of the processing step S6 is positive, e.g., "YES" at Step S6, then the CPU 14 may return to Step S2. If the determination result of the processing step S6 is negative, e.g., "NO" at Step S2, then the CPU 14 may return to Step S3.

In an embodiment of the invention, the MFP 10 may not include the browser program. Nevertheless, in another embodiment, the browser program may be included in the NVRAM 20. In that embodiment, the MFP 10 may be constituted as follows. As shown in FIG. 6C, in Step S28 of the content summary character string display process, the MFP 10 may output the content URL 146 to the NVRAM 20 to be stored in a predetermined area of the NVRAM 20, instead of outputting the content URL 146 to the PCs 70 and 71. After starting, e.g., booting up, the browser program, the MFP 10 may access the content providing servers 90 and 91 by using the content URL 146 stored in the predetermined area of the NVRAM 20. Then, the MFP 10 may display the content indicated by the content URL 146 on the display panel 50. Thus, the user may confirm the desired content by using the display panel 50 of the MFP 10.

In an embodiment of the invention, the MFP 10 may be employed as a device for displaying the content title character string 140 in a scrolling manner and for fixedly displaying the content summary character string 144. Nevertheless, the invention is not limited to this configuration. The device for displaying the content title character string 140 in a scrolling manner and for fixedly displaying the content summary character string 144 may be a device on which the display panel 50 may be mounted, e.g., a scanner, a printer, or a telephone. In such a modification, the display panel 50 mounted on the scanner, the printer, or the telephone may display the content title character string 140 in a scrolling manner and also may fixedly display the content summary character string 144.

In an embodiment of the invention, the MFP 10 may be connected to the PCs 70 and 71 via a cable, e.g., a wire, in the MFP system 2. Nevertheless, in another embodiment, a wireless communication interface may be installed in each of the MFP 10 and the PCs 70 and 71, such that the MFP 10 may be electrically connected to the PCs 70 and 71 via wireless communication by using those wireless communication interfaces. In an embodiment of the invention, each of the content providing servers 90 and 91 may store both contents and feed information. Nevertheless, the content providing server is not limited to such a configuration. In another embodiment, a server for storing contents and a server for storing feed information may be provided separately from each other.

While the invention has been described in connection with embodiments of the invention, it will be understood by those skilled in the art that variations and modifications of the embodiments described above may be made without departing from the scope of the invention. Other embodiments will be apparent to those skilled in the art from a consideration of the specification or practice of the invention disclosed herein. It is intended that the specification and the described examples are considered merely as exemplary of the invention, with the true scope of the invention being defined by the following claims.

What is claimed is:

1. A communication apparatus comprising:
a position information memory configured to store a plurality of position information;
a relational information acquisition section configured to access a plurality of devices based on the plurality of position information, and to acquire a plurality of content relational information from the plurality of devices, wherein each content relational information of the plurality of content relational information comprises a plurality of content titles and a plurality of corresponding content summary information;
a relational information memory configured to store the acquired plurality of content relational information;
a display;
a display control section configured to display each content title of each of the plurality of content relational information on the display, wherein each content title is displayed in a scrolling single-line form;
an accepting section configured to accept a selection of the displayed content title of the plurality of content titles displayed in the scrolling single-line form on the display by the display control section;
a summary display control section configured to display content summary information corresponding to the content title accepted by the accepting section on the display;
a title counter configured to count a number of times the content title displayed in the scrolling single-line form has been accepted by the accepting section during a predetermined time period;
a content relational information counter configured to count a number of selections with respect to the content relational information including the selected content title;
a selection information memory configured to store the number of times the content title displayed in the scrolling single-line form has been accepted, which is counted by the title counter;
wherein the display control section is configured to select, from among the plurality of content relational information including the plurality of content titles that are displayed on the display in the scrolling single-line form, a content relational information having a highest information priority based on a count from the content relational information counter; and
a priority setting section configured to set a priority for each content title of the plurality of content relational information based on the number of times the content title displayed in the scrolling single-line form has been accepted, which is stored in the selection information memory,
wherein the display control section is configured to display and scroll, in a descending order of the priority of each content title, each content title of each of the plurality of content relational information in a single-line form in a manner to display one content title after another,
wherein both the title counter and the content relational information counter are configured to be incremented in response to the selection of the displayed content title.

2. The communication apparatus according to claim 1, further comprising a reset section configured to reset the scrolling display of the plurality of content titles performed by the display control section, wherein when the reset section performs the reset, the display control section is configured to again display each of the content titles in a scrolling single-line form, starting from the content title having the highest priority and proceeding in descending order according to a corresponding priority of each content title.

3. The communication apparatus according to claim 1, wherein
the priority setting section is configured to set the priority of the selected content title to a higher level when an increase in the number of times the content title has been accepted during the predetermined time period is detected.

4. The communication apparatus according to claim 1, further comprising an erasure section configured to erase the number of times stored in the selection information memory for each content title, each time the relational information acquisition section acquires the content relational information, and
the priority setting section is configured to, for each content title for which the number of times the content title stored in the selection information memory reaches or exceeds a predetermined number during a period between erasures by the erasure section, set the priority of the content title to a higher level.

5. A communication apparatus comprising:
a position information memory configured to store a plurality of position information;
a relational information acquisition section configured to access a plurality of devices based on the plurality of position information, and to acquire a plurality of content relational information from the plurality of devices, wherein each content relational information of the plurality of content relational information comprises a plurality of content titles and a plurality of corresponding content summary information;
a relational information memory configured to store the acquired plurality of content relational information;
a display;
a display control section configured to sequentially select one of the plurality of the content relational information stored in the relational information memory, to display each content title of the selected content relational information on the display in a scrolling single-line form in a manner to display one content title after another, and to select another one of the plurality of the content relational information after displaying all of the content titles of the selected content relational information;
an accepting section configured to accept a selection of the displayed content title of the plurality of content titles displayed in the scrolling single-line form on the display by the display control section;
a summary display control section configured to display content summary information corresponding to the content title accepted by the accepting section on the display;
a title counter configured to count a number of times the content title displayed in the scrolling single-line form has been accepted by the accepting section during a predetermined time period;
a content relational information counter configured to count a number of selections with respect to the content relational information including the selected content title;
a selection information memory configured to store the number of times the content title displayed in the scrolling single-line form has been accepted, which is counted by the counter;
wherein the display control section is configured to select, from among the plurality of content relational information including the plurality of content titles that are displayed on the display in the scrolling single-line form, a content relational information having a highest information priority based on a count from the content relational information counter; and a priority setting section configured to set a content priority for each content relational information based on the number of times the content title displayed in the scrolling single-line form has been accepted, which is stored in the selection information memory, wherein the display control section sequentially selects each content relational information in descending order of the content priority of the content relational information set by the priority setting section, wherein both the title counter and the content relational information counter are configured to be incremented in response to the selection of the displayed content title.

6. A communication apparatus according to claim 5, wherein the selection information memory is configured to store title selection information corresponding to the content title accepted in the accepting section, the priority setting section is configured to set a title priority for each content title for each content relational information, based on the stored title selection information of the content title, and the display control section is configured to display each content title of the content relational information, which was selected based on the content priority, in a scrolling single-line form in a descending order based on the title priority of each content title.

7. The communication apparatus according to claim 6, wherein the priority setting section is configured to set the title priority of the selected content title to a higher level when an increase in the number of times the content title has been accepted during the predetermined time period is detected.

8. The communication apparatus according to claim 5, further comprising an erasure section configured to erase the number of times stored in the selection information memory for each content title, each time the relational information acquisition section acquires the content relational information, wherein the priority setting section is configured to, for each content title for which the number of times the content title stored in the selection information memory reaches or exceeds a predetermined number during a period between erasures by the erasure section, set the title priority of the content title to a higher level.

9. The communication apparatus according to claim 5, further comprising a reset section configured to reset the scrolling display of each of the content relational information performed by the display control section, wherein when the reset section performs the reset, the display control section is configured to again sequentially display each content title of each content relational information in a scrolling single-line form, starting from the content relational information having the highest content priority, and in a scrolling single-line form, and proceeding in descending order according to a corresponding content priority.

10. A non-transitory computer-readable medium configured to store computer-readable instructions thereon for controlling a scrolling display of data on a communication apparatus having a display, wherein the instructions, when executed, cause the communication apparatus to perform the steps of:

storing a plurality of position information;

accessing a plurality of devices based on the plurality of position information;

acquiring a plurality of content relational information from the plurality of the devices, wherein each content relational information of the plurality of content relational information comprises a plurality of content titles and a plurality of corresponding content summary information;

storing the acquired plurality of content relational information;

displaying each content title of each of the plurality of content relational information on the display, wherein each content title is displayed in a scrolling single-line form;

accepting a selection of the displayed content title of the plurality of content titles displayed in the scrolling single-line form on the display;

displaying content summary information corresponding to the content title accepted in the accepting step on the display;

counting a number of times the content title displayed in the scrolling single-line form has been accepted during a predetermined time period;

counting a number of selections with respect to the content relational information including the accepted content title;

storing the number of times the content title displayed in the scrolling single-line form has been accepted;

selecting, from among the plurality of content relational information including the plurality of content titles that are displayed on the display in the scrolling single-line form, a content relational information having a highest information priority based on the counted number of selections with respect to the content relational information including the accepted content title;

setting a priority for each content title of the plurality of content relational information based on the number of times the content title displayed in the scrolling single-line form has been accepted; and displaying each content title of each of the plurality of content relational information in a scrolling single-line form in a manner to display one content title after another, and scrolling each content title in a descending order of the set priority of each of the content titles;

wherein both the number of times the content title displayed in the scrolling single-line form has been accepted and the number of selections with respect to the content relational information including the accepted content title are incremented in response to the selection of the displayed content title.

11. The computer-readable medium according to claim 10, wherein the instructions, when executed, cause the communication apparatus to perform the further steps of:

resetting the scrolling display of the content titles; and subsequent to the resetting step, again displaying each of the content titles in a scrolling single-line form, starting from the content title having the highest priority and proceeding in descending order according to a corresponding priority.

12. The computer-readable medium according to claim 10, wherein the instructions, when executed, cause the communication apparatus to perform the further step of:

setting the priority of the selected content title to a higher level when an increase in the number of times the selected content title has been accepted during the predetermined time period is detected.

13. The computer-readable medium according to claim 10, wherein the instructions, when executed, cause the communication apparatus to perform the further steps of:

erasing the stored number of times each content tile has been accepted each time the content relational information is acquired; and setting, for each content title for which the number of times reaches or exceeds a predetermined number during a period between erasures, the corresponding priority of the content title to a higher level.

14. A non-transitory computer-readable medium configured to store computer-readable instructions thereon for controlling a scrolling display of data on a communication apparatus having a display, wherein the instructions, when executed, cause the communication apparatus to perform the steps of:

storing a plurality of position information;

accessing a plurality of devices based on the plurality of position information;

acquiring a plurality of content relational information from the plurality of the devices, wherein each content relational information of the plurality of content relational information comprises a plurality of content titles and a plurality of corresponding content summary information;

storing the acquired plurality of content relational information;

sequentially selecting one of the plurality of the content relational information;

displaying each content title of the selected content relational information on the display in a scrolling single-line form in a manner to display one content title after another;

selecting another one of the plurality of the content relational information after displaying all of the content titles of the selected content relational information;

accepting a selection of the displayed content title of the plurality of content titles displayed in the scrolling single-line form on the display;

displaying content summary information corresponding to the content title accepted in the accepting step on the display;

counting a number of times the content title displayed in the scrolling single-line form has been accepted during a predetermined time period;

counting a number of selections with respect to the content relational information including the accepted content title;

storing the number of times the content title displayed in the scrolling single-line form has been accepted;

selecting, from among the plurality of content relational information including the plurality of content titles that are displayed on the display in the scrolling single-line form, a content relational information having a highest information priority based on the counted number of selections with respect to the content relational information including the accepted content title;

setting a content priority for each content relational information based on the number of times the content title displayed in the scrolling single-line form has been accepted; and sequentially selecting each content relational information in descending order of the content priority of the content relational information set in the setting step, wherein both the number of times the content title displayed in the scrolling single-line form has been accepted and the number of selections with respect to the content relational information including the accepted content title are incremented in response to the selection of the displayed content title.

15. The computer-readable medium according to claim 14, wherein the instructions, when executed, cause the communication apparatus to perform the further steps of:

storing title selection information corresponding to the content title accepted in the accepting step setting a title priority for each content title for each content relational information, based on the stored title selection information of the content title; and displaying each content title of the content relational information, which was selected based on the content priority, in a scrolling single-line form in a descending order based on the title priority of each content title.

16. The computer-readable medium according to claim 14, wherein the instructions, when executed, cause the communication apparatus to perform the further step of:

setting the content priority of the selected content relational information to a higher level when an increase in the number of times the content relational information has been selected during the predetermined time period is detected.

17. The computer-readable medium according to claim 15, wherein the instructions, when executed, cause the communication apparatus to perform the further step of:

setting the title priority of the selected content title to a higher level when an increase in the number of times the content title has been selected during the predetermined time period is detected.

18. The computer-readable medium according to claim 14, wherein the instructions, when executed, cause the communication apparatus to perform the further steps of:

storing a number of times each content relational information has been selected, erasing the stored number of times the content relational information is selected each time the content relational information is acquired; and setting, for each content relational information for which the number of times the content relational information reaches or exceeds a predetermined number during a period between erasures by the erasure section, the corresponding content priority of the content relational information to a higher level.

19. The computer-readable medium according to claim 15, wherein the instructions, when executed, cause the communication apparatus to perform the further steps of:

erasing the stored number of times the content tile has been accepted each time the content relational information is acquired; and setting, for each content title for which the number of times reaches or exceeds a predetermined number during a period between erasures by the erasure section, the corresponding title priority of the content title to a higher level.

20. The computer-readable medium according to claim 14, wherein the instructions, when executed, cause the communication apparatus to perform the further steps of:

resetting the selection of the content relational information of which the corresponding content titles are displayed; and subsequent to the resetting step, again sequentially selecting each of the content relational information, starting from the content relational information having the highest content priority and proceeding in descending order according to a corresponding content priority.

\* \* \* \* \*